United States Patent
Maeda

(10) Patent No.: US 7,613,331 B2
(45) Date of Patent: Nov. 3, 2009

(54) RECORDING MEDIUM STORING MAP INFORMATION, MAP INFORMATION PROCESSING DEVICE, MAP INFORMATION PROCESSING SYSTEM, MAP INFORMATION PROCESSING METHOD, MAP INFORMATION PROCESSING PROGRAM AND RECORDING MEDIUM STORING THE MAP INFORMATION PROCESSING PROGRAM

(75) Inventor: Hidenori Maeda, Tokyo (JP)

(73) Assignee: Increment P Corporation, Tokyo (JP)

( * ) Notice: Subject to any disclaimer, the term of this patent is extended or adjusted under 35 U.S.C. 154(b) by 675 days.

(21) Appl. No.: 10/760,491

(22) Filed: Jan. 21, 2004

(65) Prior Publication Data

US 2004/0151388 A1    Aug. 5, 2004

(30) Foreign Application Priority Data

| Jan. 22, 2003 | (JP) | ............................. | 2003-013862 |
| Jan. 22, 2003 | (JP) | ............................. | 2003-013875 |
| Jan. 22, 2003 | (JP) | ............................. | 2003-013913 |
| Jan. 22, 2003 | (JP) | ............................. | 2003-013947 |

(51) Int. Cl.
*G06K 9/00* (2006.01)
*G01C 21/00* (2006.01)
*G01C 21/30* (2006.01)
*G01C 21/32* (2006.01)

(52) U.S. Cl. ...................... 382/113; 701/208; 701/209; 701/213

(58) Field of Classification Search ................. 382/232, 382/113; 701/208, 209, 213
See application file for complete search history.

(56) References Cited

U.S. PATENT DOCUMENTS 6,184,823 B1 * 2/2001 Smith et al. ............ 342/357.13
6,351,707 B1 * 2/2002 Ichikawa .................... 701/209

(Continued)

FOREIGN PATENT DOCUMENTS

EP     0 833 290 A1     4/1998

(Continued)

OTHER PUBLICATIONS

Cover page of WO 98/45823 document published Oct. 15, 1998.

(Continued)

*Primary Examiner*—John B Strege
(74) *Attorney, Agent, or Firm*—Kratz, Quintos & Hanson, LLP

(57) ABSTRACT

A server unit (400) recognizes a travel route search request together with a current position information and a destination information from a terminal unit (300) over a network (200) and searches for a travel route with use of a matching data of a map information. The server unit (400) sends a matching mesh information including a node and link that represent a road corresponding to the travel route and a display mesh information for areas other than the areas represented by the matching mesh information together with the information for the travel route to the terminal unit (300) over the network (200). The terminal unit (300) displays a road based on the matching mesh information and the information excluding the road based on the display mesh information on a terminal display. Thus, the information amount of the map information to be processed can be reduced thereby improving the processing efficiency.

32 Claims, 9 Drawing Sheets

U.S. PATENT DOCUMENTS 6,430,499 B1 * 8/2002 Nakano et al. ............... 701/208

FOREIGN PATENT DOCUMENTS

| EP | 0 838 661 A2 | 4/1998 |
| --- | --- | --- |
| JP | 5-26678 | 2/1993 |
| JP | 8-68648 | 3/1996 |
| JP | 8-327386 | 12/1996 |
| JP | 09-101744 | 4/1997 |
| JP | 10-103986 | 4/1998 |
| JP | 11-64014 | 2/1999 |
| JP | 11-95657 | 4/1999 |
| JP | 11-257975 | 9/1999 |
| JP | 2000-036097 | 2/2000 |
| JP | 2000-121371 | 4/2000 |
| JP | 2001-056823 | 2/2001 |
| JP | 3332225 | 2/2001 |
| JP | 2001-194172 | 7/2001 |
| JP | 2001-519029 | 10/2001 |
| JP | 2001-330446 | 11/2001 |
| JP | 2002-48574 | 2/2002 |
| JP | 2002-148056 | 5/2002 |
| JP | 2002-156242 | 5/2002 |
| JP | 2002-323336 | 11/2002 |
| JP | 2002-342330 | 11/2002 |

OTHER PUBLICATIONS

European Search Report of Jun. 10, 2005.
Japanese Office Action dispatched on Dec. 4, 2007 for Japanese Patent Application No. 2003-013862, with English-language translation thereof.
Japanese Office Action mailed Aug. 28, 2007 with English translation (5 pages).
Japanese Office Action for Japanese Patent Application 2003-013913 dated Jan. 27, 2009 with English-language translation.
Japanese Office Action for Japanese Patent Application 2003-013947 dated Jan. 27, 2009 with English-language translation.

* cited by examiner

FIG. 6

| TRAFFIC CONTROLS · LINK ATTRIBUTE (1) | bit7 | bit6 | bit5 | DESCRIPTION |
|---|---|---|---|---|
| | 0 | 0 | 0 | RESERVE |
| | 0 | 0 | 1 | TWO-WAY MAIN ROAD |
| | 0 | 1 | 0 | TWO-WAY FEEDER ROAD |
| | 0 | 1 | 1 | TWO-WAY SIDE ROAD |
| | 1 | 0 | 0 | ONE-WAY MAIN ROAD |
| | 1 | 0 | 1 | ONE-WAY FEEDER ROAD |
| | 1 | 1 | 0 | ONE-WAY SIDE ROAD |
| | 1 | 1 | 1 | ROAD CLOSED |

| DEFAULT ROAD WIDTH | bit4 | DESCRIPTION |
|---|---|---|
| | 0 | UNDER 5.5M |
| | 1 | 5.5M OR MORE |

| LINK TYPE | bit3 | bit2 | bit1 | bit0 | DESCRIPTION |
|---|---|---|---|---|---|
| | 0 | 0 | 0 | 0 | NATIONAL ROAD |
| | 0 | 0 | 0 | 1 | MAJOR REGIONAL ROAD |
| | 0 | 0 | 1 | 0 | STATE ROAD |
| | 0 | 0 | 1 | 1 | PUBLIC ROAD |
| | 0 | 1 | 1 | 0 | MINOR STREET |
| | 0 | 1 | 1 | 1 | MINOR STREET 2 |
| | 1 | 0 | 0 | 0 | INTERCITY HIGHWAY |
| | 1 | 0 | 0 | 1 | URBAN HIGHWAY |
| | 1 | 0 | 1 | 0 | TOLL NATIONAL ROAD |
| | 1 | 0 | 1 | 1 | TOLL MAJOR REGIONAL ROAD |
| | 1 | 1 | 0 | 0 | TOLL STATE ROAD |
| | 1 | 1 | 0 | 1 | OTHER TOLL ROAD |
| | 1 | 1 | 1 | 0 | ROAD EXCEPT FERRY ROUTE |
| | 1 | 1 | 1 | 1 | FERRY ROUTE |

FIG. 8

| NODE FLAG | | DESCRIPTION |
|---|---|---|
| | bit15 | |
| | 0 | NOT IDENTICAL |
| | 1 | IDENTICAL |
| X-COORDINATE OFFSET | | |
| Y-COORDINATE OFFSET | | |

Nxn
Nxn+1

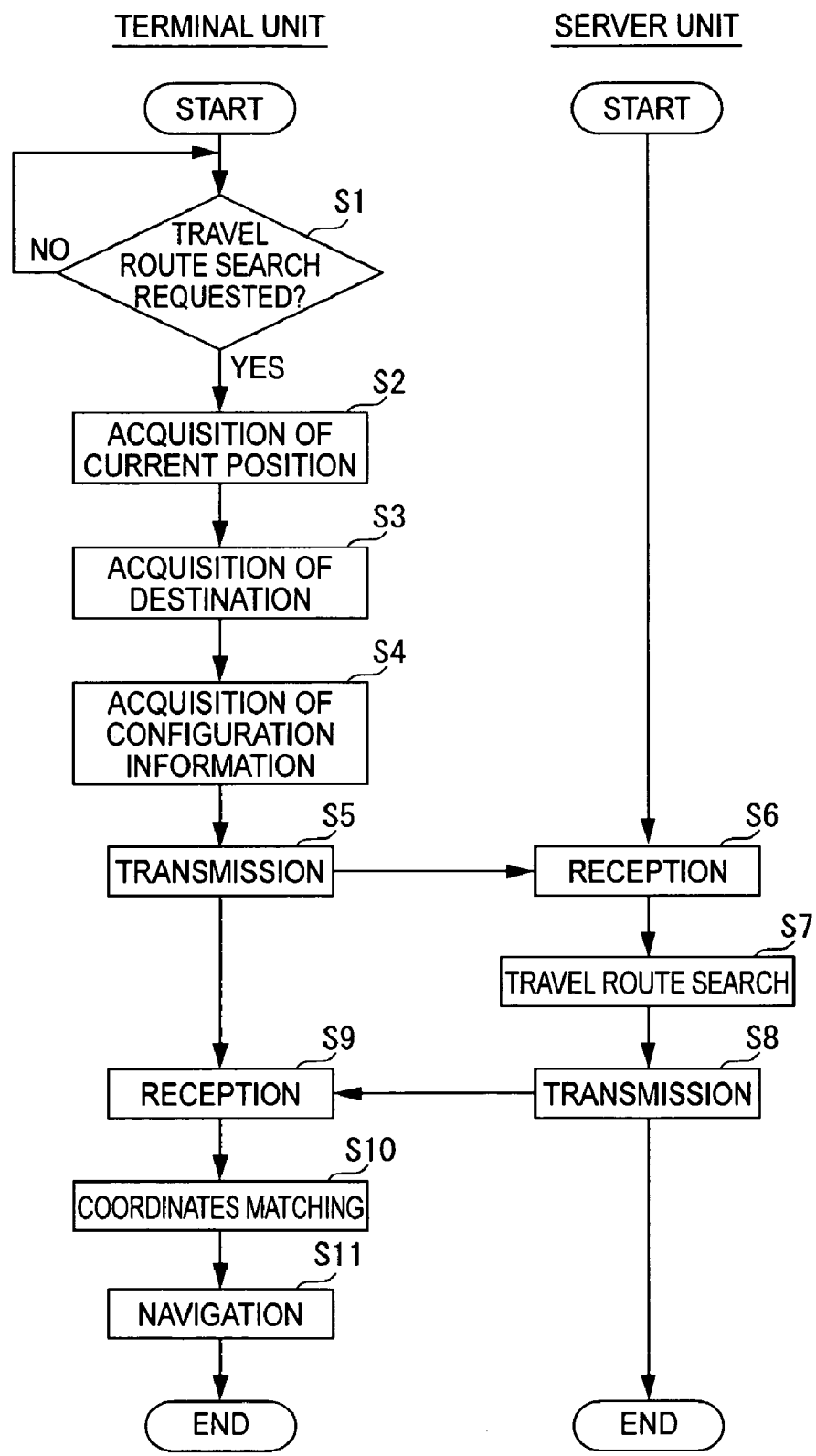

RECORDING MEDIUM STORING MAP INFORMATION, MAP INFORMATION PROCESSING DEVICE, MAP INFORMATION PROCESSING SYSTEM, MAP INFORMATION PROCESSING METHOD, MAP INFORMATION PROCESSING PROGRAM AND RECORDING MEDIUM STORING THE MAP INFORMATION PROCESSING PROGRAM

BACKGROUND OF THE INVENTION

1. Field of the Invention

The present invention is related to a recording medium storing a map information, a map information processing device for processing the map information, a map information processing system, a map information processing method, a map information processing program and a recording medium storing the map information processing program, the map information representing a road in a manner such that a pair of point information is connected with a segment information.

2. Description of Related Art

A communication navigation systems conventionally known are that acquires map information stored in sever units via communication by using mobile communication terminals such as an in-vehicle or portable navigation device, a PDA (Personal Digital Assistant), a mobile phone, a PHS (Personal Handyphone System), and a portable personal computer so as to search for information on a current position and a route to a destination, and to retrieve information on shops nearby. In such communication navigation system, since the management of map information with a large amount of data is centralized at the server unit, the mobile communication terminal need not to have a storage for storing the map information, thereby simplifying the structure, reducing in the size and the weight and readily providing the latest map information. For the purpose of smooth operation and management of the data, the map information is constituted by a plurality of digitalized map files that are divided into a plurality of areas.

A display data including an element data for an element consisting of a map is generally used when the map is displayed on a display. In other words, the display data dedicates to smoothly display the map. In a navigation system, when overlaying a current position of a vehicle onto a displayed map, a map matching processing is performed in order to display the current position in a manner such that the vehicle travels on a road in the map. It is known that the map matching processing is also performed, with the use of matching data where a road is represented by point information and segment information that connects the point information, in order to correct the current position on the basis of the matching data and the current position of the vehicle separately measured and overlay the corrected current position onto the map displayed by the display-oriented data.

A structure performing the map matching processing, however, needs both of the display data and the matching data, thus the amount of the processing data may be considerably large and a processing efficiency might not be improved.

With respect to the above problem, the data amount of the accumulating map information is tried to be reduced in order to reduce a processing load of a server unit and to simplify a structure thereof (see the right column on page 5 to the right column on page 41, Japanese Examined Publication No.3332225). In the above prior art, map files adjoining each other has a connection relationship by way of matching coordinates of nodes in adjoining positions of the map file, each node being an information for a road on the map file. Therefore, the data amount of connection nodes representing the connection relationship of the adjoining map files can be reduced.

Though the prior art reduces the data amount of the connection relationship of the map file, the data amount of the map file distributed to the mobile communication terminal, itself is hardly reduced. Therefore, a load for sending/receiving the map file to the mobile communication terminal and the processing load of the map file at the mobile communication terminal might not be reduced.

It is, therefore, required to reduce the information amount of the map information.

When the information amount of the map information is reduced too much, another problem may be raised, for instance, a display speed being slow, or specific and desired information being unavailable.

SUMMARY OF THE INVENTION

An object of the present invention is to provide a map information processing device for efficiently displaying a map, a map information processing system, a map information processing method, a map information processing program and a recording medium storing the map information processing program.

A map information processing device according to a first aspect of the present invention for displaying a current position overlaid onto a map on a display includes: a current position information acquiring section that acquires a current position information for the current position; a matching data acquiring section that acquires a matching data including a plurality of point information that has a coordinates information and a unique point information and represents predetermined points, and a segment information that has a unique segment information and connects the pair of point information, and representing a road with the point information and the segment information; a correction section that corrects the current position information so that the current position is on the road represented by the point information and the segment information of the matching data; and a display controller that displays the road based on the point information and the segment information of the matching data on the display and overlays the current position corrected by the correction section onto the displayed road on the display.

A map information processing system according to a second aspect of the present invention, includes: a terminal unit including a display for displaying a current position overlaid onto a map; and the map information processing device according to the first aspect of the present invention, the map information processing device being connected to the terminal unit over a network in a manner capable of sending/receiving various information.

A map information processing system according to a third aspect of the present invention for displaying a current position overlaid onto a map on a display, includes: a terminal unit including a current position information generating section and the display, the current position information generating section generating a current position information for the current position; and a server unit including a storage that stores a matching data including a plurality of point information that has a coordinates information and a unique point information and represents predetermined points and a segment information that has a unique segment information and connects the pair of point information and representing a road with the point information and the segment information, a current position information acquiring section that acquires the current position information from the terminal unit over a network, a correction section that corrects the current position information so that the current position is on the road represented by the point information and the segment information of the matching data, and a transceiver that outputs the matching data and the corrected current position information to the terminal unit over the network, in which the terminal unit displays the road based on the point information and the segment information of the matching data acquired from the server unit on the display and overlays the current position information acquired from the server unit and corrected onto the displayed road on the display.

A map information processing system according to a forth aspect of the present invention for displaying a current position overlaid onto a map on a display includes: a server unit provided with a storage that stores a matching data including a plurality of point information that has a coordinates information and a unique point information and represent predetermined points, and a segment information that has a unique segment information and connects the pair of point information, and representing a road with the point information and the segment information; and a terminal unit connected to the server unit over a network in a manner capable of sending/receiving various information, the terminal unit including the display, a current position information generating section that generates a current position information for the current position, a terminal transceiver that acquires the matching data from the server unit over the network, a correction section that corrects the current position information so that the current position is on the road represented by the point information and the segment information of the matching data, and a display controller that displays the road based on the point information and the segment information of the matching data on the display and overlays the current position information onto the displayed road on the display.

A map information processing method according to a fifth aspect of the present invention for displaying a current position overlaid onto a map on a display includes the steps of: acquiring a current position information for the current position; correcting the current position information so that the current position based on the acquired current position information is on a road represented by a point information and a segment information of a matching data including the plurality of point information that has a coordinates information and a unique point information and represents predetermined points and a segment information that has a unique segment information and connects the pair of point information; displaying the road based on the point information and the segment information on the display, and overlaying the current position corrected by the correction section onto the displayed road on the display.

A map information processing method according to a sixth aspect of the present invention is executed by a computing section for displaying a current position overlaid onto a map on a display of a terminal unit connected to a server unit that stores a map information over a network in a manner capable of sending/receiving various information. The map information processing method executed by the computing section includes the steps of: generating a current position information for a current position at the terminal unit; acquiring the current position information at the server unit from the terminal unit over the network; correcting the current position at the server unit so that the current position is on a road represented by a point information and a segment information of a matching data including the plurality of point information that has a coordinates information and a unique point information and represents predetermined points and a segment information that has a unique segment information and connects the pair of point information; acquiring the corrected current position information and the matching data at the terminal unit from the server unit over the network; and displaying the represented road based on the point information and the segment information of the acquired matching data on the display of the terminal unit, and overlaying the acquired and corrected current position onto the displayed road on the display.

A map information processing method according to a seventh aspect of the present invention is executed by a computing section for and displaying a current position overlaid onto a map on a display of a terminal unit connected to a server unit that stores a map information over a network in a manner capable of sending/receiving various information. The map information processing method executed by the computing section includes the steps of: generating a current position information for a current position at the terminal unit; acquiring a matching data including a plurality of point information that has a coordinates information and a unique point information and represents predetermined points, and a segment information that has a unique segment information and connects the pair of point information, and representing a road with the point information and the segment information, at the terminal unit from the server unit over the network; correcting the current position information so that the current position is on the road represented by the point information and the segment information of the acquired matching data at the terminal unit; and displaying the road based on the point information and the segment information of the matching data on the display and overlaying the corrected current position information onto the displayed road on the display.

A map information processing program according to an eighth aspect of the present invention executes the map information processing method according to the fifth to seventh aspects of the present invention by a computing section.

A recording medium according to a ninth aspect of the present invention stores the map information processing program according to the eighth aspect of the present invention in a manner readable by a computing section.

Another object of the present invention is to provide a map information processing device capable of acquiring a desired map information when the map information is distributed over a network, a map information processing system, a map information processing method, a map information processing program and a recording medium storing the program.

The map information processing device according to a tenth aspect of the present invention distributes the map information over a network, in which the map information has the matching data including the plurality of point information that has the coordinates information and the unique point information and represents the predetermined points, and the segment information that has the unique segment information and connects the pair of point information, and representing the road with the point information and the segment information, and the display data including the element data for the element constituting the map of the predetermined area corresponding to the matching data. The map information processing device includes: a request information recognizer that recognizes a request information for requesting the distribution of at least one of the matching data and the display data, and a delivery controller that distributes at least one of the matching data and the display data over the network based on the request information recognized by the request information recognizer.

A map information processing system according to an eleventh aspect of the present invention, includes: the map information processing device according to the tenth aspect of the present invention; and a terminal unit connected to the map information processing device over a network in a manner capable of sending/receiving information and provided with a transceiver that sends a request information to the map information processing device over the network and receives the distributed map information.

The map information processing system according to a twelfth aspect of the present invention distributes the map information to the terminal unit connected to the server unit that stores the map information over the network in a manner capable of sending/receiving various information, in which the server unit has the matching data including the plurality of point information that has the coordinates information and the unique point information and represents the predetermined points, the segment information that has the unique segment information and connects the pair of point information, and representing the road with the point information and the segment information, and a display data including an element data for an element constituting a map of a predetermined area corresponding to the matching data and a request information recognizer that recognizes a request information requesting the distribution of at least one of the matching data and the display data, a delivery controller that distributes at least one of the matching data and the display data over the network based on the request information recognized by the request information recognizer; and in which the terminal unit has a request information generating section that generates the request information and a transceiver that sends the request information to the server unit over the network and receives the map information distributed from the server unit.

The map information processing method according to a thirteenth aspect of the present invention distributes the map information by a computing section over a network, in which the map information has the matching data including the plurality of point information that has the coordinates information and the unique point information and represents the predetermined points, and the segment information that has the unique segment information and connects the pair of point information, and representing the road with the point information and the segment information, and a display data including an element data for an element constituting the map of a predetermined area corresponding to the matching data. The map information processing method executed by the computing section includes the steps of: recognizing a request information for requesting the distribution of at least one of the matching data and the display data, and distributing at least one of the matching data and the display data over the network based on the recognized request information.

A map information processing program according to an fourteenth aspect of the present invention executes the map information processing method according to the thirteenth aspect of the present invention by a computing section.

A recording medium according to a fifteenth aspect of the present invention stores the map information processing program according to the fourteenth aspect of the present invention in a manner readable by a computing section.

Still another object of the present invention is to provide a map information processing device reducing a distributing information amount when a map information is distributed over a network to provide the traveling state of a movable body with use of the map information, a map information processing system, a map information processing method, a map information processing program and a recording medium storing the program.

The map information processing device according to a sixteenth aspect of the present invention distributes the map information over the network and providing the traveling state of a movable body with use of the map information, in which the map information has the matching data including the plurality of point information that has the coordinates information and the unique point information and represents the predetermined points, the segment information that has the unique segment information and connects the pair of point information, and representing the road with the point information and the segment information and the plurality of matching mesh information divided into predetermined areas, and the display data including the element data for the element constituting the map of the predetermined area corresponding to the matching data. The map information processing device includes: a storage for storing the map information; an information acquiring section that acquires the current position information for the current position of the movable body and a destination information for a destination to which the movable body travels; a search section that searches a travel route on which the movable body travels with use of the matching data based on the current position information and the destination information; and a delivery controller that distributes the matching mesh information including the point information and the segment information that represent the road corresponding to the searched travel route and the display mesh information corresponding to the area other than the area represented by the matching mesh information together with information for the travel route over the network.

A map information processing system according to a seventeenth aspect of the present invention includes: the map information processing device according to the sixteenth aspect of the present invention; and a terminal unit connected to the map information processing device over the network in a manner capable of sending/receiving information, the terminal unit including an information generating section that generates a current position information and a destination information of a movable body, a display capable of displaying a map information and a display controller that displays a road based on a matching data of the map information distributed from the map information processing device and information for a travel route, and also displays information excluding the road based on a display data.

The map information processing system according to an eighteenth aspect of the present invention displays the traveling state of the movable body on the display of the terminal unit connected to the server unit that stores the map information over the network in a manner capable of sending/receiving various information, in which the map information has the matching data including the plurality of point information that has the coordinates information and the unique point information and represents the predetermined points, the segment information that has the unique segment information and connects the pair of point information, and representing the road with the point information and the segment information and a plurality of matching mesh information divided into predetermined areas, and a display data including an element data for an element constituting a map of a predetermined area corresponding to the matching data, in which the terminal unit has the display, a current position information generating section that generates a current position information for a current position of the movable body, a destination information generator that generates a destination information for a destination to which the movable body travels, and in which the server unit has a storage that stores the map information, an information acquiring section that acquires the current position information and the destination information, a search section that searches a travel route on which the movable body travels with use of the matching data based on the current position information and the destination information, and a delivery controller that distributes a matching mesh information including the point information and the segment information that represent the road corresponding to the searched travel route and a display mesh information corresponding to an area other than the area represented by the matching mesh information together with an information for the travel route to the terminal unit.

The map information processing method according to a nineteenth aspect of the present invention distributes the map information by a computing section over a network to provide the traveling state of a movable body with use of the map information, in which the map information has the matching data including the plurality of point information that has the coordinates information and the unique point information and represents the predetermined points, the segment information that has the unique segment information and connects the pair of point information, and representing the road with the point information and the segment information and a plurality of matching mesh information divided into predetermined areas, and a display data including an element data for an element constituting the map of a predetermined area corresponding to the matching data. The map information processing method executed by the computing section includes the steps of: acquiring a current position information for a current position of the movable body and a destination information for a destination to which the movable body travels; searching a travel route on which the movable body travels with use of the matching data based on the current position information and the destination information; and distributing a matching mesh information including the point information and the segment information that represent the road corresponding to the searched travel route and a display mesh information corresponding to an area other than the area represented by the matching mesh information together with information for the travel route over the network.

A map information processing program according to a twentieth aspect of the present invention executes the map information processing method according to the nineteenth aspect of the present invention by a computing section.

A recording medium according to a twenty-first aspect of the present invention stores the map information processing program according to the twentieth aspect of the present invention in a manner readable by a computing section.

Further object of the present invention is to provide a recording medium capable of reducing the information amount of a map information, a map information processing device, a map information processing system, a map information processing method, a map information processing program and a recording medium storing the map information processing program.

A recording medium according to a twenty-second aspect of the present invention stores a map information including a plurality of point information that has a coordinates information and a unique point information and represents predetermined points, and a segment information that has a unique segment information and connects the pair of point information, and representing a road with the point information and the segment information, in which the point information has a flag information showing a relation with other point information according to the determination whether the represented points are identical or not and representing the road arrangement.

The map information processing device according to a twenty-third aspect of the present invention includes: a map information acquiring section that acquires at least the point information out of the map information from the recording medium storing the map information according to the twenty-second aspect of the present invention; and a coordinates matching section that recognizes the relation of the point information with other point information based on the flag information of the point information acquired by the map information acquiring section and recognizes the road arrangement.

The map information processing device according to a twenty-fourth aspect of the present invention perform a processing on the map information including the plurality of point information that has the coordinates information and the unique point information and represents the predetermined points, and the segment information that has the unique segment information and connects the pair of point information, and representing the road with the point information and the segment information, in which the point information has a flag information showing a relation with other point information according to the determination whether the represented points are identical or not and representing the road arrangement. The map information processing device includes: a map information acquiring section that acquires at least the point information out of the map information; and a coordinates matching section that recognizes the relation with other point information based on the flag information of the point information acquired by the map information acquiring section and recognizes the road arrangement.

A map information processing system according to a twenty-fifth aspect of the present invention includes: the map information processing device according to the twenty-third or the twenty-fourth aspect of the present invention; and a terminal unit that acquires the road arrangement recognized by the map information processing device over a network.

A map information processing system according to a twenty-sixth aspect of the present invention includes: the map information processing device according to the twenty-third or the twenty-fourth aspect of the present invention; and a terminal unit that acquires a travel route searched by the map information processing device over a network.

The map information processing system according to a twenty-seventh aspect of the present invention processes the map information stored in the storage, the map information including the plurality of point information that has the coordinates information and the unique point information and represents the predetermined points, and the segment information that has the unique segment information and connects the pair of point information, and represents the road with the point information and the segment information, in which the point information has a flag information showing a relation with other point information according to the determination whether the represented points are identical or not and representing the road arrangement. The map information processing system includes: a map information processing device that recognizes the road arrangement by recognizing the relation with other point information based on the flag information; and the terminal unit that acquires the road arrangement recognized by the map information processing device over the network.

The map information processing method according to a twenty-eighth aspect of the present invention processes the map information including the plurality of point information that has the coordinates information and the unique point information and represents the predetermined points, and the segment information that has the unique segment information and connects the pair of point information, and represents the road with the point information and the segment information; in which the point information has a flag information showing a relation with other point information according to the determination whether the represented points are identical or not and representing the road arrangement. The map information processing method includes the step of: recognizing the road arrangement by recognizing the relation with other point information based on the flag information.

The map information processing method according to a twenty-ninth aspect of the present invention, according to the twenty-second aspect of the present invention includes the step of recognizing the road arrangement by recognizing the relation with other point information based on the flag information of the map information stored in a recording medium storing the map information.

A map information processing program according to a thirtieth aspect of the present invention executes the map information processing method according to the twenty-eighth or the twenty-ninth aspect of the present invention by a computing section.

A recording medium according to a thirty-first aspect of the present invention stores the map information processing program according to the thirtieth aspect of the present invention in a manner readable by a computing section.

BRIEF DESCRIPTION OF THE DRAWINGS

FIG. 6 is an explanatory illustration showing a table structure of linked-line block information according to the embodiment;

FIG. 8 is an explanatory illustration showing a table structure of point information according to the embodiment;

FIG. 9 is a flowchart showing how the navigation system operates to search for a travel route according to the embodiment.

DETAILED DESCRIPTION OF PREFERRED EMBODIMENT(S)

Now, an embodiment of the present invention will be described with reference to attached drawings.

In the embodiment below, a communication navigation system is designated as an example of a map display control system of the present invention.

[Structure of Navigation System]

Figure 1:
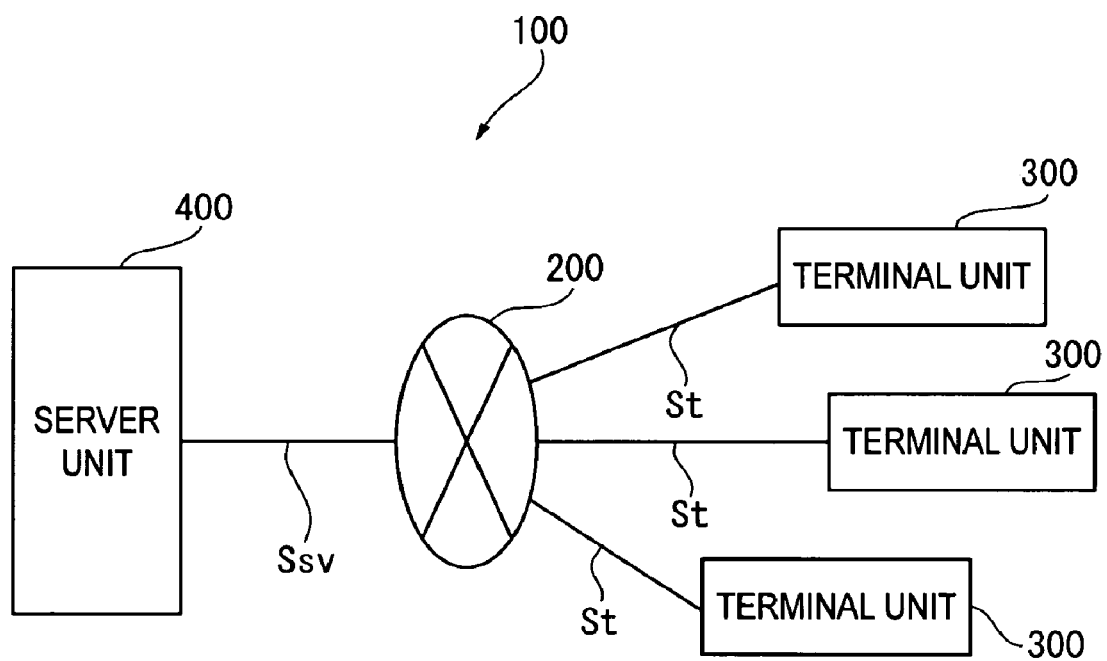
FIG. 1 is a block diagram showing a brief structure of a navigation system according to an embodiment of the present invention.

In FIG. 1, a reference numeral 100 denotes the communication navigation system as a map display control system. The navigation system 100 provides guidance according to the traveling state of a movable body such as a vehicle, an aircraft and a ship. The navigation system 100 has a network 200, a terminal unit 300 i.e., a navigation device, which can function as a map display control apparatus, and a server unit 400, which can function as the map display control apparatus.

The terminal unit 300 and the server unit 400 are connected to the network 200. The terminal unit 300 and the server unit 400 are connected each other over the network 200 in a manner such that information can be sent/received between them. The network 200 may be Internet based on a general-purpose protocol such as TCP/IP protocol, an intranet, a LAN (Local Area Network), a communication network and a broadcasting network that have a plurality of base stations that can send/receive information by way of a radio medium, or the radio medium itself that realizes direct information exchange between the terminal unit 300 and the server unit 400. The radio medium may be applied to any of electric waves, light beams, sound waves and electromagnetic waves.

Figure 2:
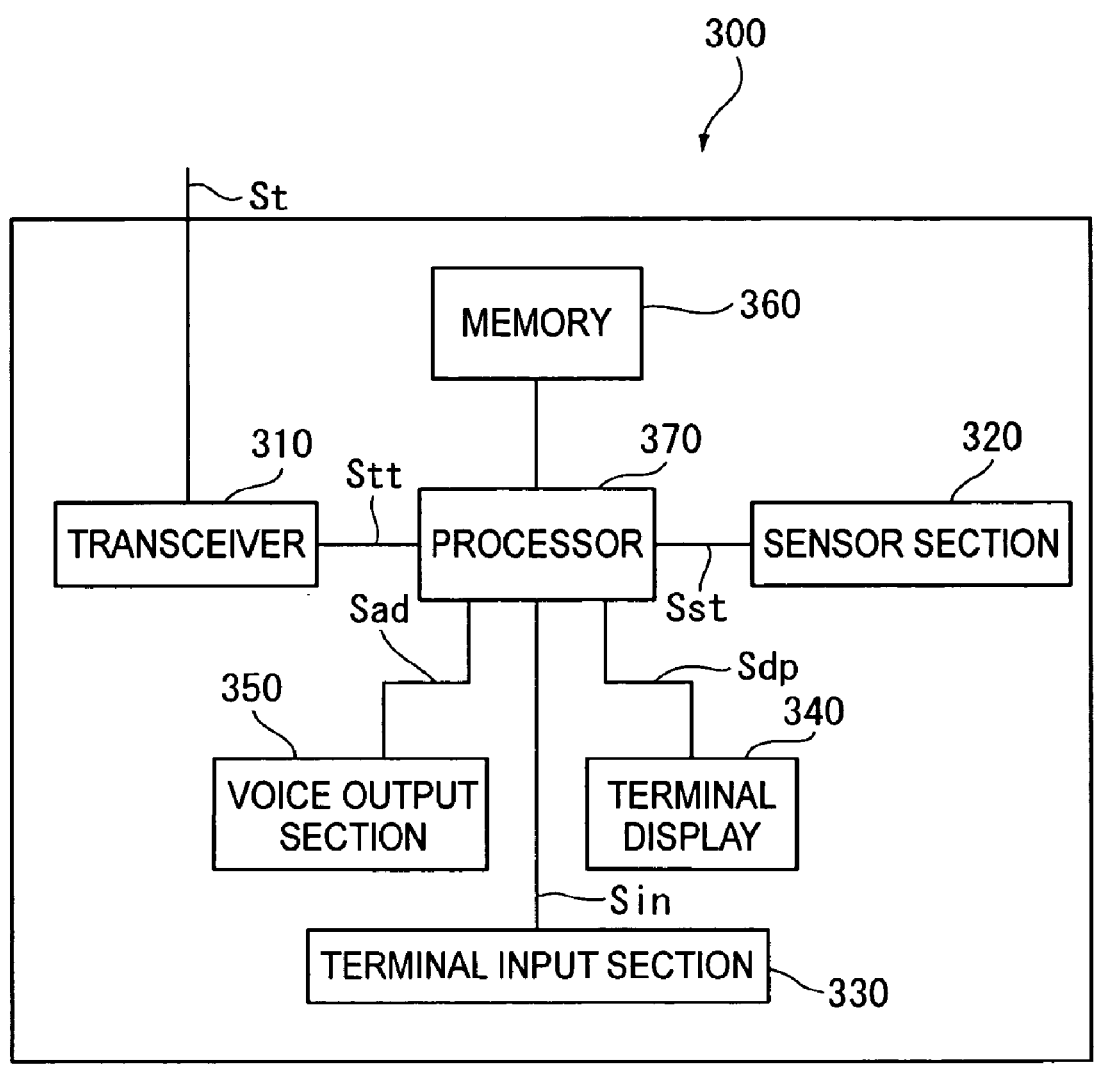
FIG. 2 is a block diagram showing a brief structure of a terminal unit according to the embodiment.

The terminal unit 300 may be, for example, an on-board unit installed in a vehicle as a movable body, a portable unit, a PDA (Personal Digital Assistant), a mobile phone, a PHS (Personal Handyphone System) or a portable personal computer. The terminal unit 300 acquires below-described map information distributed by the server unit 400 over the network 200. On the basis of the map information, the terminal unit 300 displays information on a current position and a destination, searches for and displays a route to the destination and predetermined shops nearby, or displays information on service contents of the shops. The terminal unit 300, as shown in FIG. 2, has a transceiver 310 as a terminal communication section, which can function as a matching data acquiring section and a display data acquiring section, a sensor section 320 as a positioning section, a terminal input section 330 as a terminal operation section, a terminal display 340 as a terminal display, a voice output section 350, a memory 360 as a terminal storage and a processor 370 as a processing section.

The transceiver 310 is connected to the server unit 400 over the network 200, and also connected to the processor 370. The transceiver 310 can receive a terminal signal St from the server unit 400 over the network 200. When acquiring the terminal signal St, the transceiver 310 performs a preset input interface processing so as to output the terminal signal St as a processing terminal signal Stt to the processor. The transceiver 310 can also input the processing terminal signal Stt from the processor 370. When acquiring the processing terminal signal Stt to be input, the transceiver 310 performs a preset output interface processing so as to send the processing terminal signal Stt as the terminal signal St to the server unit 400 over the network 200.

The sensor section 320 detects the traveling state of the vehicle, i.e. a current position and the driving status so as to output the state as a predetermined signal Ssc to the processor 370. The sensor section 320, for instance, has a GPS (Global Positioning System) receiver (not shown) and various sensors (not shown) such as a speed sensor, a direction sensor and an acceleration sensor. The GPS receiver receives an electric navigation wave output from a GPS satellite (not shown), which is an artificial satellite, by way of a GPS antenna (not shown). Then, the GPS receiver computes a pseudo-coordinates value of the current position on the basis of a signal corresponding to the received electric navigation wave and outputs the pseudo-coordinates value as GPS data to the processor 370.

The speed sensor included in the sensor section 320 is arranged on the vehicle so as to detect driving speed and actual acceleration of the vehicle on the basis of a signal that changes in response to the vehicle speed. The speed sensor reads a pulse signal, a voltage value and the like output by the revolution of the axles and the wheels of the vehicle. Then, the speed sensor outputs the detected information on the pulse signal, the voltage values etc. to the processor 370. The direction sensor is arranged on the vehicle and provided with a so-called gyro-sensor (not shown) so as to detect a direction of the vehicle, i.e., a driving direction of the vehicle for advancing. The direction sensor outputs a signal representing the detected information on the driving direction to the processor 370. The acceleration sensor is arranged on the vehicle so as to detect the acceleration of the vehicle in the driving direction thereof. The acceleration sensor converts the detected acceleration into a sensor output value i.e., the detected information based on the pulse and the voltage, and then output the sensor output value to the processor 370.

The terminal input section 330, which may be a keyboard, a mouse or the like, has various operation buttons (not shown) for an input operation. The input operation with the operation buttons includes, for instance, configuration for setting operational preferences for the terminal unit 300. More specifically, the operation buttons may be used: to issue an instruction for carrying out a communication operation, i.e., a communication request information as an acquisition request information for acquiring information over the network 200; to specify contents of information to be acquired and an acquisition criteria; to set a destination; to retrieve information; and to display the driving status as the traveling state of the vehicle. When the configuration is input, the terminal input section 330 outputs a predetermined signal Sin to the processor 370 so as to set the configuration. Note that in the terminal input section 370, without limiting to the operation buttons, a touch panel provided at the terminal display 340 or voice may be employed for the input operation to specify various configurations.

The terminal display 340 is controlled by the processor 370 to display a signal Sdp representing image data sent from the processor 370. The image data may be those representing the below-described map information and a retrieval information sent form the server unit 400, a TV image data received by a TV receiver (not shown), an image data stored in a recording medium such as an optical disk or a magnetic disk and read by a drive, i.e. an external device, and an image data in the memory 360. The terminal display 340, to be specific, employs a liquid crystal panel, an organic EL (electroluminescence) panel, a PDP (Plasma Display Panel) or a CRT (Cathode-ray Tube) etc.

The voice output section 350 has a voicing section such as a speaker (not shown). The voice output section 350 is controlled by the processor 370 to output various signals Sad, which may be voice data sent from the processor 370, in voice form by using the voicing section. Information output in voice form, which includes, for example, the driving direction and the driving status of the vehicle, is provided to a passenger such as a driver of the vehicle for navigating the vehicle. The voicing section can appropriately output, for example, a TV voice data received by a TV receiver and a voice data recorded on an optical disk or a magnetic disk. The voice output section 350 is not restricted to the structure with the voicing section, but may be a structure using a voicing section equipped on the vehicle instead.

The memory 360 appropriately stores the various information acquired over the network 200, the configurations input by the terminal input section 330, the music data, the image data and the like. The memory 360 also stores various programs running on an OS (Operating System) for controlling the whole operation of the terminal unit 300. Note that the memory 360 may have a drive or a driver for storing data in HD (Hard Disk) or an optical disk in a readable form.

The processor 370 has various input/output ports (not shown) including, for example, a communication port connected to the transceiver 310, a GPS receiving port connected to the GPS receiver, sensor ports connected respectively to various sensors, a key input port connected to the terminal input section 330, a display control port connected to the terminal display 340, a voice control port connected to the voice output section 350 and a memory port connected to the memory 360. The processor 370 has various programs (not shown) including a current position recognizer as a current position information generating section, a destination recognizer, an information retriever, a guidance providing section, a display controller, a map matching section as a correction section, a coordinates matching section, a re-search section and the like. The processor 370 further includes an internal clock that enables to acquire a time information on the current date and the time.

The current position recognizer recognizes the current position of the vehicle. More specifically, it calculates a plurality of current pseudo-positions of the vehicle on the basis of the speed data and the direction data output respectively from the speed sensor and the direction sensor in the sensor section 320. The current position recognizer further recognizes the current pseudo-coordinates values of the vehicle on the basis of the GPS data on the current position output from the GPS receiver. Then, the current position recognizer compares the calculated current pseudo-positions with the recognized current pseudo-coordinates value, and calculates the current position of the vehicle on the map information independently acquired to recognize the current position.

The current position recognizer determines a slope angle and an altitude of a drive road on the basis of the acceleration data output from the acceleration sensor and calculates the current pseudo-position of the vehicle so as to recognize the current position. In other words, the current position of the vehicle can accurately recognized even if the vehicle is on an intersection with an overpass or on an elevated highway where roads are mutually overlapping in a two-dimensional view. Furthermore, when the vehicle is running on a mountain road or a slope, the recognizer corrects the difference between the travel distance obtained only on the basis of the speed and the direction data and the actual driving distance by using the detected slope angle of the road to accurately recognize the current position.

The current position recognizer can recognize not only the current position of the vehicle as described above but also a starting point, i.e. an initial point specified with the terminal input section 330 as the current pseudo-position. Various information acquired by the current position recognizer are appropriately stored in the memory 360.

The destination recognizer, for instance, acquires a destination information on the destination specified with the input operation at the terminal input section 330 and recognizes the position of the destination. The specified destination information includes, for example, coordinates such as latitude and longitude, addresses, telephone numbers and various information that identify a location. Such destination information recognized by the destination recognizer is appropriately stored in the memory 360.

The information retriever acquires the various information stored in the memory 360 and associated with the retrieval information on the basis of the retrieval information that is included in the information acquired by the transceiver 310. Specifically, for example, an item information to be retrieved is shown on the terminal display 340 by using a list screen, a number key screen for inputting a numeric value like numbers, and a character input screen for inputting characters such as Japanese alphabet and English alphabet. Then the memory 360 appropriately acquires the hierarchically arranged item information with the input operation at the terminal input section 330. In this way, the information is retrieved.

The guidance providing section provides guidance in visual form by using the terminal display 340 or in voice form by using the voice output section 350. The guidance is related to the travel of the vehicle, for instance, the contents for assisting the drive of the vehicle on the basis of the travel route information acquired in advance according to the driving status and stored in the memory 360. The guidance providing section, for instance, displays a predetermined arrow and a symbol on the screen of the terminal display 340. The guidance providing section also provides messages such as "Turn right toward YY at the intersection of XX in 700 m ahead." "The vehicle is off the travel route." and "There is a traffic jam in the route ahead" in voice form by using the voice output section 350.

The display controller appropriately controls the terminal display 340 so that the terminal display 340 displays the various information such as the map information. Upon the control of the display controller, the terminal display 340 can also display various screens for retrieving information with the information retriever.

The map matching section performs a map matching processing for appropriately displaying the current position recognized by the current position recognizer on the basis of the below-described map information acquired by the server unit 400. In the map matching processing, the current position information is appropriately corrected or amended to avoid locating the current position overlaid onto the map displayed on the terminal display 340 off the road, which is an element constituting the map displayed on the terminal display 340, and the corrected information is displayed. In the map matching processing, the below-descried map matching data is utilized as the map information.

The coordinates matching section performs a coordinates matching processing for determining whether two or more sets of point information, i.e., information on nodes N in the below-described matching data MM in the map information acquired by the server unit 400 indicate an identical point or not. Namely, the coordinates matching section acquires the point information on the nodes N in the matching data MM and reads coordinates information that constitutes the point information. Specifically, the coordinates matching section calculates the coordinates values such as latitude and longitude on the basis of the coordinates values on the coordinates information and an offset amount. If the nodes N have identical coordinates values (as shown in a chained line in FIG. 7), the coordinates matching section reads a flag information that constitutes the point information on the nodes N and determines whether the node flags are "1" or "0". If both of the node flags are "1", the nodes N indicate an identical point such as an intersection. Therefore, the coordinates matching section determines that the road is arranged in a manner that links L, each of which is connected to any of the nodes N and constitutes own linked-line block information, are crossing each other. If at least one node flag of the two sets of the point information is "0", the nodes N do not indicate an identical point such as an intersection with an overpass. Then, the coordinates matching section determines that the road is arranged in a manner that links L, each of which is connected to the respective nodes N and constitutes own linked-line block information, are not crossing each other.

The re-search section re-searches for a secondary travel route to the destination by using matching mesh information MMx acquired by the server unit 400 when the current position is off the travel route acquired by searching with the below-described server unit 400. More specifically, the re-search section acquires the current position information, the destination information, and the configuration information for setting the secondary route. Then, on the basis of the acquired information, the re-search section searches for a road, which may be available for traffic, different from the travel route previously acquired by the server unit 400 and searches for the secondary route with shorter travel time, that with shorter travel distance, or that without a traffic jam and a traffic regulation. At this time, the re-search section uses the matching mesh information MMx in the matching data MM in the map information, which has been acquired by the server unit 400 with the travel route search. Note that, in re-searching for the secondary travel route, the re-search section appropriately searches for the secondary route on the basis of the road arrangement determined with the coordinates matching processing performed by the coordinates matching section. The travel route information contains, for example, a route guidance information for assisting the drive with navigation during the drive of the vehicle. The route guidance information is appropriately displayed or output in voice form at the terminal unit 300 for assisting the drive. The re-search section determines that the secondary route can not be searched when, for example, the area covered by the previously acquired matching mesh information MMx is too small to detect a travel route other than the previously acquired travel route; or when a processing ability of hardware is limited due to capacity shortage of the memory 360 of the terminal unit 300 and the like. In such cases, the re-search section sends a signal to the server unit 400 to re-search for the secondary travel route.

Figure 3:
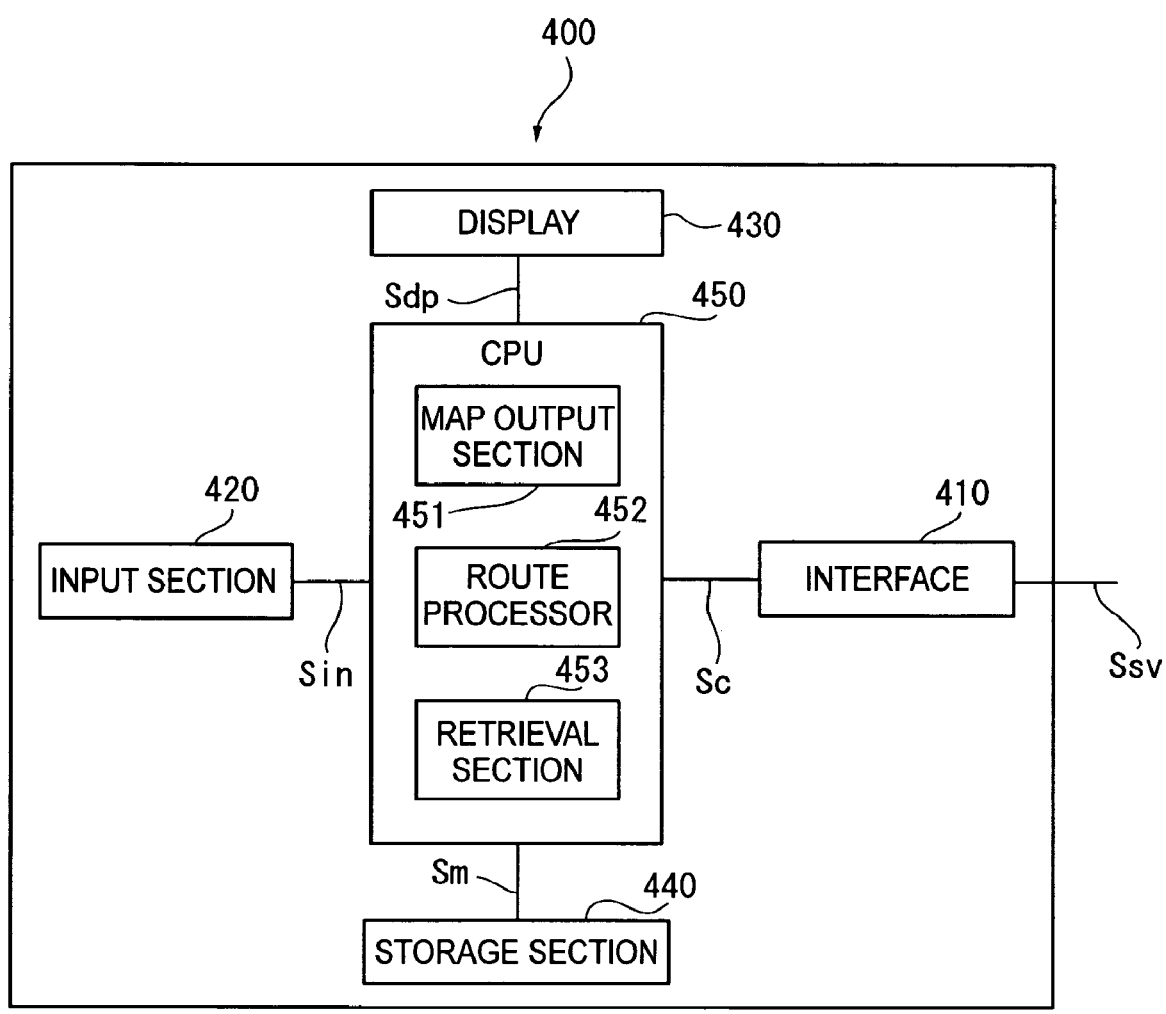
FIG. 3 is a block diagram showing a brief structure of a server unit according to the embodiment.

The server unit 400 can send/receive information to/from the terminal unit 300 over the network 200. In addition, the server unit 400 can retrieve various information over the network 200 from servers (not shown) that are installed in various public offices including the Meteorological Agency and the National Police Agency, private organizations, the Vehicle Information and Communication System (VICS) and business enterprises. The information acquired by the server unit 400 includes a travel information, i.e., various travel related information that is utilized during the travel of the vehicle such as a weather information, a traffic information including a traffic jam, a traffic accident, a road construction and traffic regulation, and a shop information including a gasoline station and a restaurant etc. As shown in FIG. 3, the server unit 400 has an interface 410, an input section 420, a display 430, a storage section 440, a CPU (Central Processing Unit) 450 as a computing section and the like.

The interface 410 performs a preset input interface processing on a server signal Ssv input over the network 200 so as to output the server signal Ssv as the processing server signal Sc to the CPU 450. When the CPU 450 inputs the processing server signal Sc to be sent to the terminal unit 300 to the interface 410, the interface 410 performs preset output interface processing on the input processing server signal Sc so as to output the processing server signal Sc as a server signal Ssv to the terminal unit 300 over the network 200. Note that the server signal Ssv can be appropriately output only to a predetermined terminal unit 300 on the basis of the information indicated in the server signal Sc.

The input section 420, which may be a keyboard, a mouse or the like, has various operation buttons (not shown) for an input operation, just like the terminal input section 320. The input operation with the use of the operation buttons are employed to specify configuration, more specifically, to set operational preferences for the server unit 400, to set information to be stored in the storage section 440, and to update information stored in the storage section 440 and the like. When the configuration is input, the input section 420 outputs a signal Sin corresponding to the configuration to the CPU 450 so as to specify the configuration. Note that not limiting to the operation buttons, a touch panel provided on the display 430 or voice may be used for the input operation to specify various configurations.

The display 430, just like the terminal display 340, is controlled by the CPU 450 to display a signal Sdp representing an image data sent from the CPU 450. The image data may be acquired from the storage section 440 or the respective servers.

The storage section 440 stores various information received from the terminal unit 300 or the external server and a map information in a readable form. Specifically, the storage section 440 has a storage medium (not shown) for storing information, a drive or a driver (not shown) as a reading section for storing information in the storage medium in a manner that the information can be read from the storage medium. Information to be stored may include, for example, information input with the input operation at the input section 420, and the contents of the information stored with the input operation can be appropriately updated. The storage section 440 also stores various programs running on an OS (Operating System) for controlling the whole operation of the server unit 400 and the navigation system 100 as information.

Figure 4:
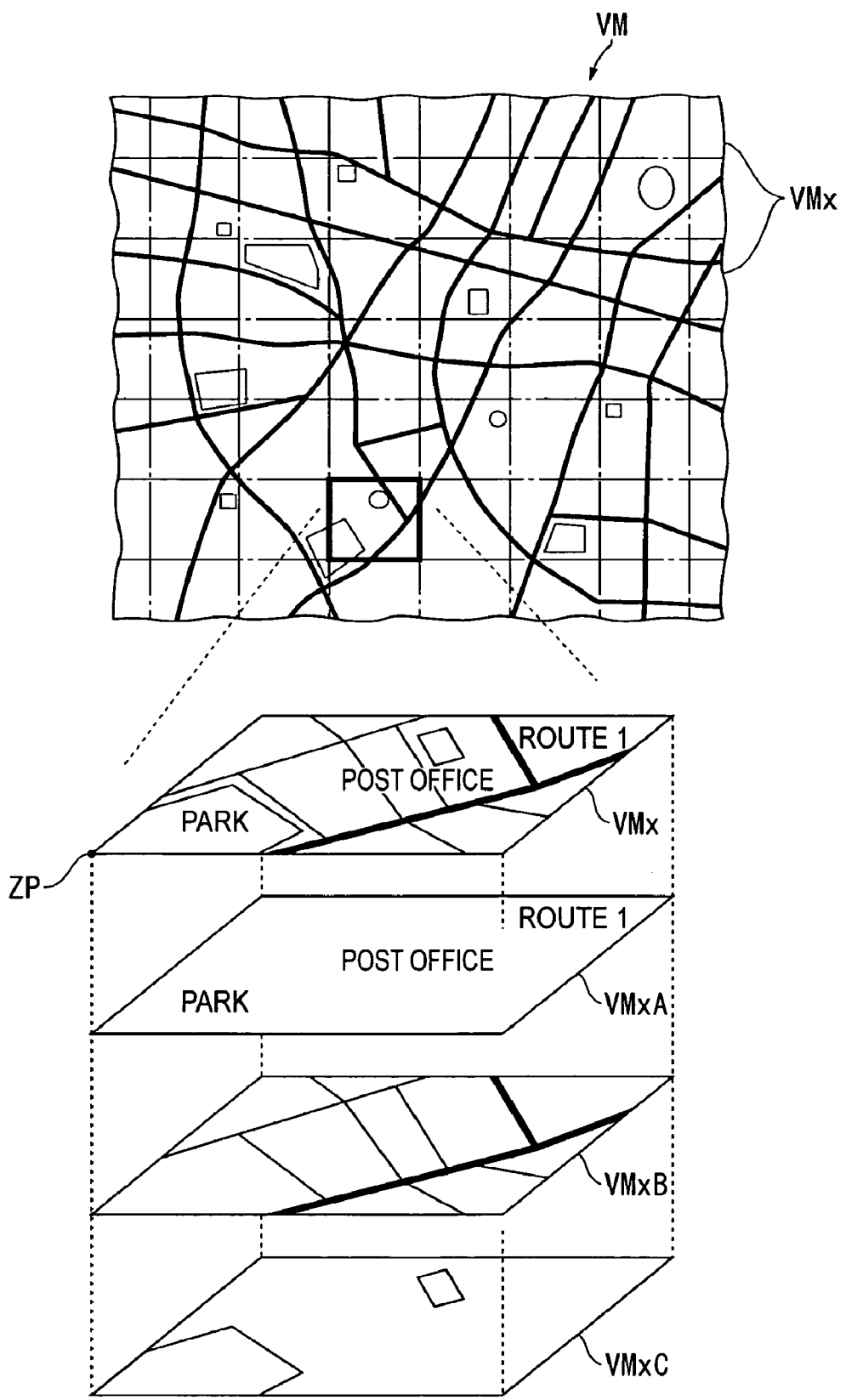
FIG. 4 is a conceptual diagram schematically showing a table structure of display data of map information according to the embodiment.
Figure 5:
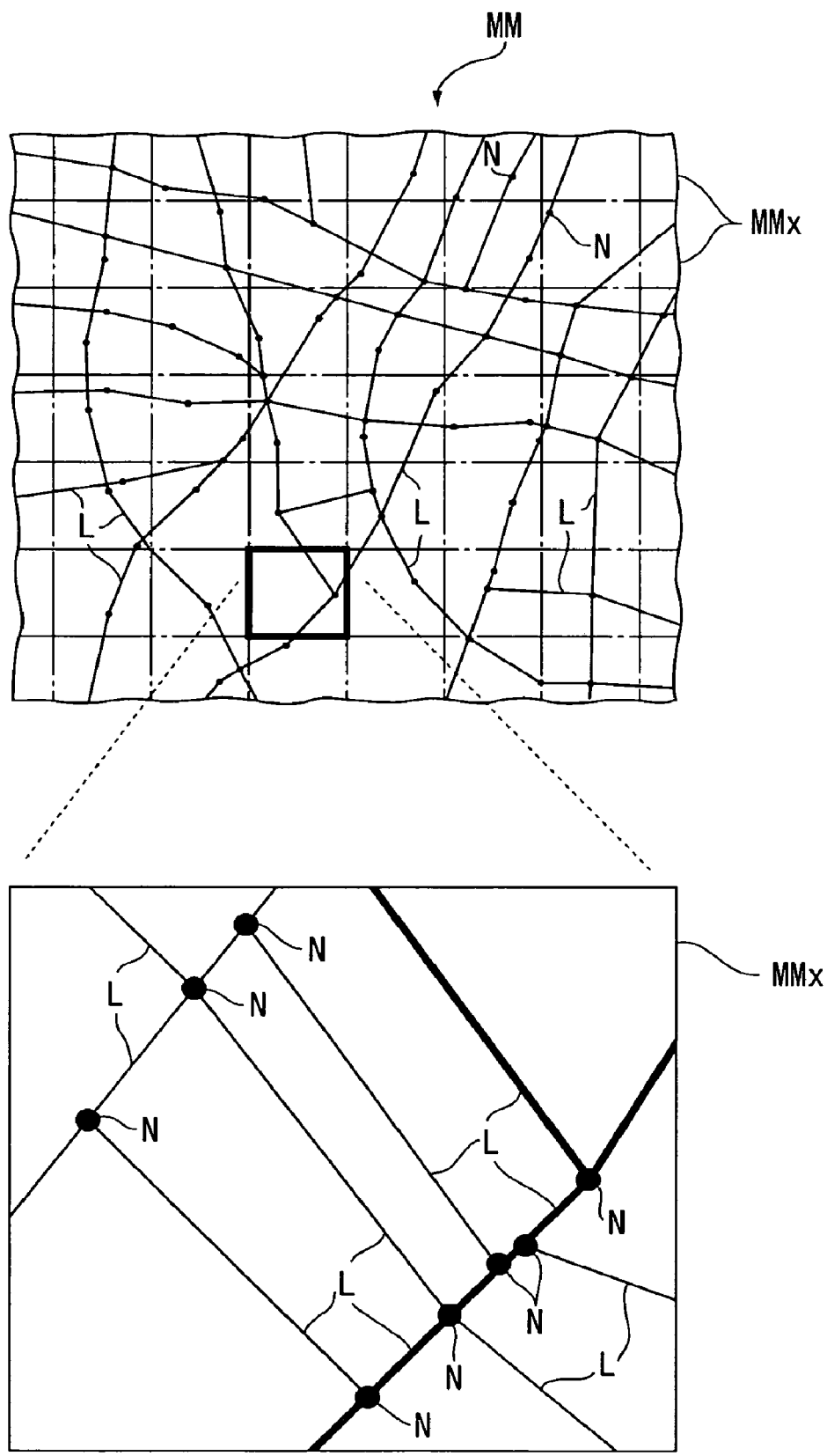
FIG. 5 is a conceptual diagram schematically showing a table structure of matching data in the map information according to the embodiment.

The map information as information includes a display data VM, i.e., so-called POI (Point Of Interest) data as shown in FIG. 4, a matching data MM as shown in FIG. 5, a map data for travel route search and the like.

The display data VM includes, for example, a plurality of display mesh information VMx each of which has a unique number. To be more specific, the display data VM is divided into a plurality of display mesh information VMx each of which relates to an area. The display data VM is formed with the plurality of display mesh information VMx continuously arranged in a matrix form. The display mesh information VMx may be further divided into a plurality of downscale display mesh information VMx each of which appropriately relates to a smaller area. The display mesh information VMx is rectangular shaped with each side thereof having a predetermined length, i.e., a length reduced from the actual geographic length according to the scale of the map, and a predetermined corner thereof having absolute coordinates ZP relative to a whole map information, e.g., a global map.

The display mesh information VMx is, for instance, constituted by a name information VMxA such as intersection names, a road information VMxB and a background information VMxC. The name information VMxA is constituted by a table structure for data that positions and displays, e.g., an intersection name and a regional name in the area, at a predetermined position according to the spatial relationship with the absolute coordinates ZP. The road information VMxB is constituted by a table structure for data that positions and displays a road in the area at a predetermined position according to the spatial relationship with the absolute coordinates ZP. The background information VMxC is constituted by a table structure for data that positions and displays a symbol representing a famous place or building, an image information representing the famous place or the building at a predetermined position according to the spatial relationship with the absolute coordinates ZP.

The matching data MM, just like the display data VM, is divided into the plurality of matching mesh information MMx each of which has a unique number and relates to an area. The matching data MM is formed with the plurality of matching mesh information MMx continuously arranged in a matrix form. The matching mesh information MMx may be further divided into a plurality of matching mesh information MMx to be located at a lower layer each of which relates to a smaller area. Each matching mesh information MMx has a rectangular shape with each side thereof having a predetermined length, i.e., a length reduced from the actual geographic length according to the scale of the map. At a predetermined corner thereof, absolute coordinates ZP relative to a whole map information, e.g., a global map is contained. Note that the matching mesh information MMx may have a data structure that represents an area different from the area represented by the display mesh information VMx, that is, the matching mesh information MMx may use a scale for the area division different from that used by the display mesh information VMx. If a same scale is used, a unique number information may be used for associating the data. If a different scale is used, the absolute coordinates may be used for associating data.

The matching data MM is used for the map matching processing for correcting the position of the vehicle on the screen to be located on a road so as to avoid displaying errors such that the vehicle is displayed on a building instead of the road, when the traveling state of the vehicle is overlaid onto the map information on the screen. The matching data MM has the plurality of linked-line block information.

Figure 7:
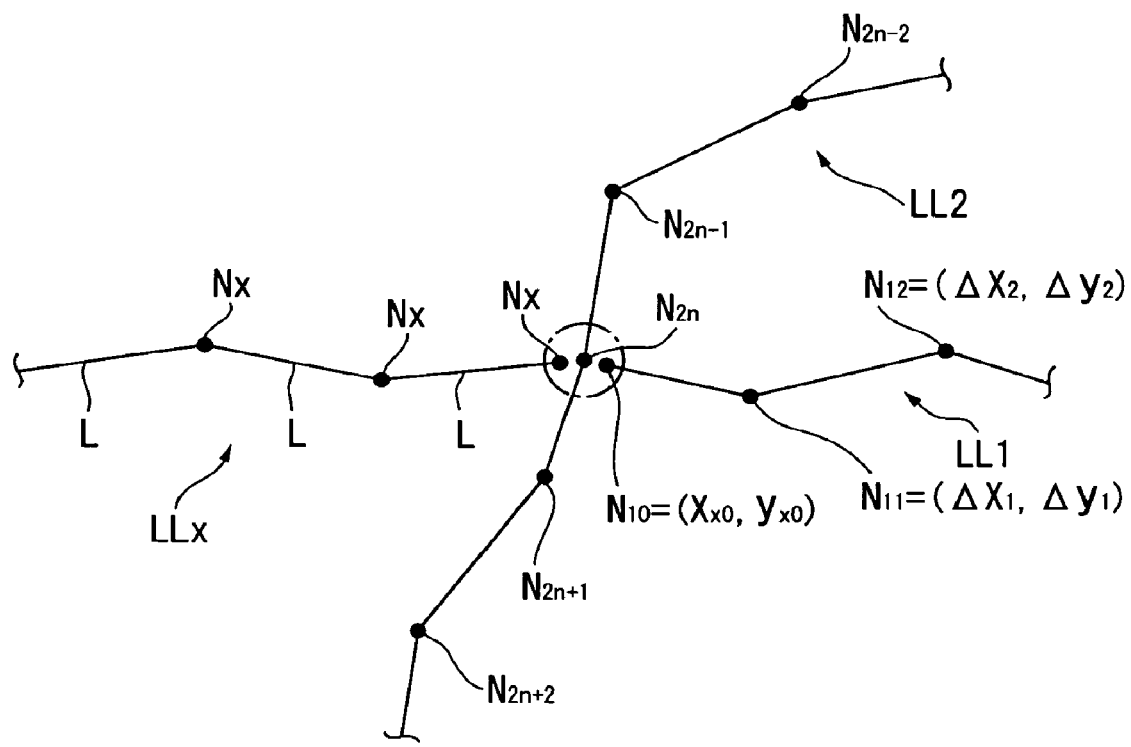
FIG. 7 is an explanatory illustration showing relation between nodes and links in the matching data according to the embodiment.

As shown in FIG. 6, the linked-line block information is constituted by a table structure for data in which a plurality of links L, that are segment information connecting nodes N (shown as dots in FIG. 5) as the point information constituting roads and representing points, are mutually associated according to a predetermined rule. Specifically, the linked-line block information is associated with a linked-line LL, where the link L, i.e. a predetermined length of the road, are sequentially connected as shown in FIGS. 5 and 7, e.g., KOSHU street and OME street. Each link L has a unique number i.e., a unique segment information (hereafter referred to as a link ID) and a node information that may be a unique number indicating the two nodes N connected by a link L.

Each node N may represent a knotting point such as an intersection of roads, a turning point, a branching point or a joining point. Information on the node N has a unique point information that is a unique number assigned to each node N in the linked-line block information, coordinates information representing the position where each node N is located, and flag information that is branching information telling if the node N represents an intersection or a branching point where a plurality of links cross or not. There may be the nodes N that only have the unique point information without the flag information and the coordinates information for simply representing the shape of a road, or the nodes N additionally having an attribute information that represents the road arrangement such as width of a tunnel and a road. The nodes N without the flag information for simply representing the road shapes are not used by the below-described coordinates matching section for recognizing the identification on the point information.

As shown in FIG. 7, in case of a node Nx0 corresponding to a starting point of the link L of the road that constitutes linked-line block information, the coordinates information is information on coordinates relative to the absolute coordinates ZP. As shown in FIGS. 7 and 8, in case of a node Nx1 connected to the node Nx0 for the starting point with a link L, a node Nx2 connected to the node Nx1 with a link L and the following node Nxn, the coordinates information is information on an offset amount from the node Nx0 for the starting point or from a connected node Nxn. The node N to be a standard for the offset amount is specified in accordance with record order of the table structure, that is, the offset amount form the preceding node N constitutes the coordinates information.

The flag information represents whether the points represented by the nodes are identical or not and represents the road arrangement on the basis of relation with other nodes. To be more specific, the flag information, as shown in FIG. 8, is represented by the node flag "0" or "1". "1" means that the nodes N for another road, or the nodes N in another linked-line block information, indicates an identical position which may be an intersection. "0" means that the position is identical in a two-dimensional view but not identical in reality and may be an intersection with an overpass.

Further, the linked-line block information in the matching data MM is associated with information on the road arrangement that describes, for example, number of lanes, whether it is a main line or not, whether it is a national road or a state road, a road type such as a tall road, a tunnel structure and the like. Based on the information on such road arrangement, a road can be displayed on a map corresponding to the display data VM.

The map information for travel route search, similar to the matching data, has a table structure including the point information for representing the points such as the nodes N for representing a road and the segment information for connecting points such as the links L. The information is structured to represent a road for searching for a travel route.

The storage section 440, for instance, stores the retrieval information for acquiring information on a predetermined point on the map information. The retrieval information is information for responding to the search request from the terminal unit 300, and includes various information such as contents describing names of a state, a city, an area, and a location, which are areas to be sequentially segmentalized on the map information, and guidance as well as various information on a shop as a point. The table structure thereof applies tree structure in which the item information is hierarchically associated each other.

The storage section 440 further stores a personal information that is information on a user for the navigation system 100 with the use of terminal units 300. The personal information includes a name, an address, an ID number assigned to each user, a password, a type of the terminal unit 300 for the use of the navigation system 100, an address number for sending/receiving information to/from the terminal unit 300. Furthermore, the storage section 440 stores various information that is used for performing the navigation processing in a manner readable by the CPU 450.

The CPU 450, with the use of various programs stored in the storage section 440, includes a map output section 451, a coordinates matching section (not shown), a route processor 452 as a search section, a retrieval section 453 and the like.

When a processing server signal Sc is input, according to the information indicated in the processing server signal Sc for requesting a distribution of information on the map information, the map output section 451 searches for the requested information, such as the display data VM and the matching data MM corresponding to a predetermined area, from the map information stored in the storage section 440 and reads it as a memory signal Sm. The map output section 451 appropriately converts the read memory signal Sm into the processing server signal Sc, outputs the memory signal Sm on the basis of the processing server signal Sc to predetermined or all terminal units 300 via the interface 410 and the network 200, and distributes the requested information in the map information.

The coordinates matching section, just like the above-described coordinates matching section of the terminal unit 300, performs coordinates matching processing for determining whether two or more sets of point information, i.e., information on the nodes N in the matching data MM in the map information indicate an identical point or not.

When the processing server signal Sc is input, according to the information indicated in the processing server signal Sc for requesting a route search, the route processor 452 computes and searches for the travel route using the map information stored in the storage section 440 and generates the memory signal Sm. The route processor 452 appropriately converts the generated memory signal Sm into the processing server signal Sc, outputs the memory signal Sm on the basis of the processing server signal Sc to a predetermined terminal unit 300 via the interface 410 and the network 200, and provides the travel route.

More specifically, the route processor 452 acquires a current position information, a destination information, and a configuration information for setting a route from the terminal unit 300. Then, on the basis of the acquired information, the route processor 452 searches for a road, which may be available for traffic, by using the map information for travel route search, sets a route with shorter travel time, a route with shorter travel distance, or a route without a traffic jam and a traffic regulation, and generates a travel route information as the memory signal Sm. Note that in searching for the travel route, the route processor 452 might use the matching data MM in the map information other than the map information for travel route search. This applies to, for instance, the case where the route processor 452 searches for the travel route including and a narrow road such as a back road which is not contained in the map information for the travel route search. When the matching data MM is used, the route is appropriately searched according to the road arrangement determined by the coordinates matching section at the CPU 450. The travel route information contains, for example, the route guidance information for assisting the drive with navigation during the drive of the vehicle. The route guidance information is appropriately displayed or output in voice form at the terminal unit 300 for assisting the drive.

When the processing server signal Sc is input, according to the information indicated in the processing server signal Sc for requesting a retrieval of the retrieval information, the retrieval section 453 hierarchically retrieves the retrieval information stored in the storage section 440 on the basis of the item information and reads it as the memory signal Sm. The retrieval section 453 appropriately converts the read memory signal Sm into the processing server signal Sc, outputs the memory signal Sm on the basis of the processing server signal Sc to the predetermined terminal unit 300 via the interface 410 and the network 200, and distributes the retrieval information.

According to the signal Sin input from the input section 420 by the input operation at the input section 420, the CPU 450 appropriately computes with the contents corresponding to the input operation, and appropriately generates a signal Sdp. Then the CPU 450 appropriately outputs the generated various signals to the display 430, the interface 410 and the storage section 440 and operates them so as to execute the input contents.

[Operation of Navigation System]

The operation of the navigation system 100 will be described below in reference to the drawings. FIG. 9 is a flowchart that shows how the navigation system operates to search for a travel route.

Firstly, a user on the vehicle turns ON the terminal unit 300 to supply electric power. As the electric power is supplied, the processor 370 controls the terminal display 340 so as to display a main menu and prompt the user to specify the contents to be operated by the terminal unit 300.

As shown in FIG. 9, the user may specify processing, for example, for searching for a travel route with the input operation at the terminal input section 330. When the processor 370 recognizes that terminal processing for searching for the travel route is specified (Step S1), the processor 370 instructs the terminal display 340 to display a screen for prompting the user to specify various information necessary for the travel route search such as the configuration information including a destination, a priority on the shortest distance or the shortest time. The processor 370 recognizes the various information necessary for the travel route search, sends a signal for requesting the travel route search along with the various information to the server unit 300 over the network 200, so that the route processor 452 of the server unit 300 execute the search processing for the travel route.

In other words, the processor 370 recognizes the current position by using the current position recognizer (Step S2) and also recognizes the specified destination by using the destination recognizer (Step S3). Specifically, the current position recognizer calculates the current position of the vehicle on the basis of the speed data and the direction data respectively output from the speed sensor and the direction sensor in the sensor section 320 and the GPS data on the current position output from the GPS receiver, and acquires the current position information. The acquired current position information is appropriately stored in the memory 360.

The processor 370 controls the terminal display 340 to display a screen for prompting the user to specify the destination with the input operation at the terminal input section 330. When the user specifies the destination with the input operation at the terminal input section 330 according to the displayed instruction on the screen, the destination recognizer acquires the destination information on the specified destination. The acquired destination information is appropriately stored in the memory 360.

Upon the destination input operation at the terminal unit 330, when requesting information on a point as the destination point, the user performs the input operation for requesting retrieval information on the point according to the displayed instruction displayed on the terminal display 340. According to the retrieval request for the retrieval information on the point, the processor 370 controls the transceiver 310 to send a signal that requests the retrieval of the retrieval information to the server unit 400. Upon the receipt of the signal, the server unit 400 appropriately operates the retrieval section 453, so that the downscale mesh information of each area hierarchically searches for the retrieval information on the destination by using, for instance, the map information MP to acquires the retrieval information associated with the destination point from the storage section 440. Then the server unit 400 sends the acquired retrieval information on the destination to the terminal unit 300 via the interface 410 and the network 200. When the terminal unit 300 acquires the acquired retrieval information on the destination, the processor 370 appropriately controls the terminal display 340 to display the retrieval information.

If the retrieval information includes instructions for displaying a predetermined area of the map information including the destination, or if the user who recognized the retrieval information specifies to display the predetermined area with the input operation at the terminal unit 330, the server unit 400 sends the retrieval information as well as the display mesh information VMx corresponding to the area, so that the terminal display 340 appropriately displays at the terminal unit 300. In this way, the terminal unit 300 acquires and displays the desired map information. Thereafter, the user appropriately sets the destination with the input operation at the terminal input section 330 by, for example, moving a cursor on the map displayed on the screen so as to designate the point information on the destination. When the point information on the destination is designated, the destination recognizer of the processor 370 recognizes the point information on the destination as the destination information to be appropriately stored in the memory 360.

The processor 370 controls the terminal display 340 to display a screen for prompting the user to input the configuration, i.e., criteria for the travel route search. When the user specifies the configuration with the input operation at the terminal input section 330 according to the displayed instruction on the screen, the processor 370 acquires the configuration information on the specified configuration (Step S4). The acquired configuration information is appropriately stored in the memory 360.

Then, the processor 370 controls the transceiver 310 to send a signal for requesting the travel route search as well as the current position information, the destination information and the configuration information stored in the memory 360 to the server unit 400 (Step S5). When the server unit 400 acquires the current position information, the destination information, the configuration information and the signal for requesting the travel route search (Step S6), the route processor 452 performs the route search processing for searching for the travel route from the current position of the vehicle to the destination by using the map information for travel route search and the matching data MM in the map information stored in the storage section 440. Specifically, when searching for a major street whose data is accumulated and maintained in the map information for the travel route search, the route search processing is performed by using the map information for the travel route search. On the other hand, when searching for a minor street whose data is not accumulated in the map information for the travel search, the route from a minor street to a major street is searched by using the matching data MM. As for the route search processing with the use of the matching data MM, the processing is carried out after the coordinates matching section determines whether the plurality of nodes N indicate the identical point or not to recognize the road arrangement based on the relations between links L. The route processor 452 detects a plurality of travel routes, selects some of them according to the acquired configuration information, and generates the travel route information on some travel routes that satisfy the criteria specified by the user (Step S7).

According to the information such as an ID (Identification) Number for identifying the terminal unit 300 that is sent along with the configuration information, the server unit 400 controls the interface 410 to send the travel route information acquired as the result of the route search and the map information to the predetermined terminal unit 300 (Step S8). Note that the matching data MM may be acquired in advance according to the current position information. The map information to be sent in the above step is sufficient to have only the matching mesh information MMx in the matching data MM containing the nodes N and the links L representing a road that corresponds to the travel route, the display mesh information VMx in the display data VM representing areas excluding those represented by the matching mesh information MMx, the name information VMxA and the background information VMxC in the area that corresponds to the matching mesh information MMx.

When the processor 370 of the terminal unit 300 acquires the travel route information (Step S9), the processor 370 performs the coordinates matching processing on the acquired matching data MM (Step S10), recognizes the road arrangement or the road connection so that the memory 360 appropriately stores the information. Thereafter, the processor 370 controls the terminal display 340 to display the travel route overlaid onto the acquired map information.

Subsequently, the processor 370 recognizes the traveling state of the vehicle based on the data output from the speed sensor, the direction sensor and the acceleration sensor at the sensor section 320 and the GPS data output from the GPS receiver. Then, the processor 370, by the guidance providing section, provides the guidance information on the travel of the vehicle in voice form or in visual form based on the recognized traveling state and the route guidance information contained in the travel route information acquired by the server unit 400 so as to navigate the vehicle (Step S11).

To be more specific, the display controller at the processor 370 connects the nodes N, which are contained in the matching mesh information MMx acquired by the server unit 400, with polylines. Then the processor 370 processes the polylines based on the road arrangement described in the linked-line block information constituting the matching data MM so that the terminal display 340 displays the road in the area corresponding to the matching mesh information MMx in which the travel route is contained. The display controller overlays the name information VMxA and the background information VMxC, that are element data on elements constituting the map except for a road in the area corresponding to the matching mesh information MMx in the display mesh information VMx acquired by the server unit 400. The display controller further overlays the current position onto the displayed map.

At the time of the overlay of the current position, the map matching processing is performed on the basis of the matching data MM in order to avoid locating an indicator representing the current position information of the vehicle off the displayed road. Namely, the processor 370 appropriately corrects the current position information so that the current position on the screen is located on the matching data MM for the travel route. Thus the current position is displayed on the linked-line that is the sequence of links L. In this way, the current position is overlaid onto the map to provide the navigation. When the current position reaches the predetermined position, guidance on the travel direction and the like are provided in voice form or in visual form as described above. Note that the coordinates matching processing is performed upon the acquisition of the matching data MM in the Step S10, the coordinates matching processing may be performed along with or before the map matching processing.

If the user specifies to display areas other than the above-descried area with the input operation at the terminal input section 330, a map is displayed based on the display mesh information VMx acquired by the server unit 400 in the same manner as the route search.

During the travel of the vehicle, the guidance providing section acquires traffic information including a traffic jam, a traffic accident, a road construction and a traffic regulation, a weather information and the like. In other words, the processor 370 of the terminal unit 300 appropriately acquires the traffic information and the weather information by the server unit 400 over the network 200. Then, when the acquired traffic information and the weather information imply that the traveling state of the vehicle may be affected or changed, the guidance providing section provides guidance considering such affect and change.

When the route or the destination is changed during the travel, the processor 370 recognizes that the current position is off the travel route. Then the re-search section re-searches for a secondary travel route from the current position to the destination other than the travel route previously acquired by the server unit 400, that is, performs rerouting. In the rerouting, the re-search section re-searches the matching mesh information MMx that is acquired in advance by the server unit 400 to acquire the secondary travel route. Then the navigation is continued based on the acquired secondary travel route.

When the terminal unit 300 determines that the secondary route can not be searched when, for example, the matching mesh information MMx acquired in advance does not serve for the rerouting, the re-search section sends a signal from the transceiver 310 to the server unit 400 over the network 200 for instructing the rerouting so that the route processor 452 of the server unit 400 performs rerouting. Then as in the case of the route search, information on the secondary travel route detected by the rerouting and the matching mesh information MMx containing the secondary travel route are sent to the terminal unit 300 for enabling navigation by the terminal unit 300. There is no need to send the display data VM since the display data VM has been already sent.

[Advantages of Embodiment]

According to the above-described embodiment, the map matching processing is performed to appropriately correct the current position information so that the current poison of the terminal unit 300 on the basis of the acquired current position information is located on the road displayed on the basis of the matching data MM in which nodes N and links L represent a road. The road is displayed on the terminal display 340 on the basis of the nodes N and the links L in the matching data MM instead of the display data VM. The elements constituting the map except for a road in the display data VM are appropriately displayed with the use of elements data on these elements while the corrected current position is overlaid onto the displayed road.

Accordingly, there is no need to use the road information VMxB in the display data VM for displaying the road. The map is displayed by using a part of display data VM such as the name information VMxA and the background information VMxC, thereby reducing information amount to be processed and improving processing efficiency.

According to the above described embodiment, the server unit 400 acquires and recognizes the request information for requesting the distribution of at least one of the matching data MM and the display data VM in the map information set by the terminal unit 300 over the network 200, and distributes at least one of the matching data MM and the display data VM in the map information stored in the storage section 440 to the terminal unit 300 over the network 200.

When the terminal unit 300 acquires the map information stored in the server unit 400, e.g. for providing the traveling state of the vehicle over the network 200, the terminal unit 300 may employ a structure in which the road corresponding to the travel route is displayed with use of the matching data MM while the matching data MM is used for the map matching processing, and another road other than the road displayed with use of the matching data MM is displayed with use of the display data VM, to decrease the load for sending/receiving the map information. The terminal unit 300 may employ another structure in which both of the display data VM and the matching data MM are acquired to display the map and to perform the map matching processing in a prompt and smooth manner. The terminal unit 300 may employ still another structure in which only the distribution of the display data VM is requested to minimize the information amount. The arrangement can comply with the performance and the ability of the terminal unit 300 or with request of users, thereby expanding the versatility.

Further, the server unit 400: searches the travel route, where the vehicle is traveling, with use of the matching data MM representing the road by the node N which represents the point and the link L which connects the pair of nodes N based on the acquired current position information for the current position of the vehicle and the destination information for the destination to which the vehicle is traveling; and distributes the matching mesh information MMx of the matching data MM which is divided into predetermined areas including the node N and the link L representing the road corresponding to the searched travel route, and the display mesh information VMx which is divided into predetermined areas including the display data VM corresponding to areas other than the areas of the matching mesh information MMx, together with the information for the travel route, to the terminal unit 300 over the network 200.

The display of the road with use of the matching data MM only needs to distribute the matching data MM corresponding to the travel route necessary for the map matching processing to display the traveling state of the vehicle in an improved manner, and the display data VM for displaying the areas uncovered by the matching data MM, therefore, the information amount of the matching data MM with comparatively large information amount can be largely reduced. Thus, the information amount of the map information distributed by the server unit 400 to search the travel route and provide the traveling state of the vehicle can be largely reduced.

The server unit 400 also distributes a secondary element data for displaying an element consisting of the map excluding the road of the display mesh information VMx for the areas corresponding to the matching mesh information MMx.

Since the distributed secondary element data is overlaid onto the road displayed with use of the matching mesh information MMx, a map similar to the map displayed with the display data VM can be displayed, thereby realizing the preferable navigation.

The navigation system 100, therefore, can contribute to reduction of the communication load for sending/receiving the map information between the server unit 400 and the terminal unit 300 and preferable navigation processing. Moreover, the terminal unit 300 is not required high processing ability, mobile phones can serve sufficiently as the terminal unit 300, so that the field of use thereof is expanded. Also, the size and the weight of the terminal unit 300 can be easily reduced, so that the installation to the movable body having difficulty of finding the installation space can be facilitated.

Furthermore, instead of using the matching data MM only, the map is displayed by using the display data VM, as the map information acquired results of the route search, that is dedicated to display functions in a prompt and smooth manner, since the map matching processing is not necessary. Thus, the map information can be effectively utilized.

When displaying the map during the navigation for the vehicle, the road in the area including the travel route acquired by the route search are displayed on the basis of the matching mesh information MMx in the area corresponding to the matching data MM. On the other hand, peripheral area is displayed on the basis of the display mesh information VMx in the display data VM in a prompt and smooth manner since the map matching process is not necessary. Thus, the preferable navigation as well as the smooth and prompt map display can be provided with the minimum map information.

Since the matching data MM contains information on the road arrangement as the linked-line block information, the matching data MM can display the road distinguishing, for instance, national roads and city roads. Accordingly, the map can be favorably displayed.

When a road is displayed on the basis of the matching data MM, the polylines generated by using nodes N are processed. It is therefore possible to easily realize a configuration in which the map can be displayed without the display data VM.

In order to indicate that a plurality of nodes N represent an identical point, the nodes N may be associated with a single node N representing one point, the node N being used in a upscale matching mesh information MMx for wider area division. Alternatively, data that has a table structure indicating a node N is identical with other nodes N may be additionally provided. With the method of associating with the upscale node N for representing the identity of nodes N, however, when new roads are established or road arrangement are changed due to a construction and accordingly linked-lines are changed, the relation with the upscale node N is changed so that the association might not be acquired. With the method of adding information of the table structure for representing the identity, the volume of the map information cannot be reduced. Therefore, the storage section 440 might require a large storage space, the communication load might be increased for sending/receiving the map information, or loads for the route search and the matching processing for avoiding to locate the vehicle off the displayed road.

As mentioned earlier, in the above-described embodiment, the point information on nodes N in the matching data MM, which is constituted by nodes N and links L in the map information stored in the storage 300 of the server unit 400, include the flag information for indicating relation with other nodes N depending if they indicate an identical point so as to indicate relation of links L and represent the road arrangement. With this arrangement, only by adding a node flag with small information volume such as "0" and "1" to the point information on nodes N, the identity of nodes N can be represented so that the volume of the map information can be considerably reduced. Accordingly, the storage space of the storage section 440 necessary for storing the map information is reduced and thereby enabling to store other various information. The communication load for sending/receiving the map information between the server unit 400 and the terminal unit 300 can be also reduced. Moreover, loads for the route search and the map matching processing for avoiding to locate the vehicle off the displayed road can be reduced and preferable navigation can be provided. Moreover, as the terminal unit 300 is not required high processing ability, mobile phones can serve sufficiently as the terminal unit 300, so that the field of use thereof is expanded. Also, the size and the weight of the terminal unit 300 can be easily reduced, so that the installation to the movable body having difficulty of finding the installation space can be facilitated.

In the flag information for representing the identity of nodes N, "0" indicates that nodes N are not identical and "1" indicate that nodes N are identical. In this way, as the flag information is represented by two-bit information, the amount of the map information can be easily reduced. Since the flag information is represented by the minimum amount of the information such as "0" and "1" only to tell if nodes N are identical or not, the coordinates matching section can readily determine if the nodes N are identical or not. Thus, the map information can be effectively used.

The coordinates matching section uses the flag information in the map information to recognize the road arrangement. This facilitates recognition of the road arrangement represented by the linked-lines while the map information with reduced volume can be efficiently used.

The storage section 440 and the coordinates matching section are arranged in the single server unit 400. Therefore, upon the route search with the use of the map information, the map information is smoothly processed, that is, the road arrangement is promptly recognized, thereby realizing more efficient use of the map information. Note that the server unit 400 may not perform the coordinates matching process.

The terminal unit 300 for navigation is provided with the coordinates matching section. With this arrangement, upon the navigation, the coordinates matching processing can be performed at the time of the map matching processing on the matching data MM, thereby enabling smooth processing. Moreover, when the terminal unit 300 re-searches for a secondary travel route by using the matching data MM, the coordinates matching is performed. In this way, the secondary travel route is searched only within the terminal unit 300, thereby achieving the smooth processing.

The management of the map information is centralized at the server unit 400. With this arrangement, when a part of the map information is changed, it is only need to change the map information stored in the storage section 440 of the server unit 400. The system is so configured that the updated map information is distributed to the terminal units 300 over the network 200. At all of the terminal units 300, there is no need to change the map information stored therein, thereby realizing the efficient use of map information.

The server unit 400 is provided with the route processor 452 for the route search processing with the use of the map information. Thus, the route search can be performed in a prompt and smooth manner. Furthermore, as the terminal unit 300 is not required to perform the search processing, the terminal unit 300 is not required to have high processing ability, so that mobile phones can serve sufficiently as the terminal unit 300.

Since the coordinates matching section is provided as a program used in the server unit 400, efficient use of the map information is readily realized and the promotion of the usage can be easily achieved. Additionally, the program may be stored in a recording medium so as to be read by a computing section or a computer for easy realization of the efficient use of the map information as well as for easy handling of the program and promotion of the usage.

The computing section may be a single personal computer, a combination of a plurality of computers that are connected over a network, an element such as a CPU or a microcomputer, or a circuit board on which a plurality of electronic parts are mounted.

[Modification of Embodiment]

The present invention is not limited to the above specific embodiment, but includes modifications and improvements as long as the objects of the present invention can be attained.

The movable body is a vehicle in the above description. The present invention, however, can be applied to any movable body such as an airplane or a ship. Or, the user oneself may be the movable body since the current position of the user carrying the terminal unit 300 is recognized as the current position of the terminal unit 300. Additionally, a mobile phone or a PHS (Personal Handyphone System) may be used as the terminal unit 300 that can be carried by the user, while the base station of the mobile phone or the PHS may be used as the server unit 400. With this arrangement, the mobile phone or the PHS is adapted to acquire information from the base station.

The acquisition of information in the navigation system 100 adapted to provide guidance according to the traveling state of the vehicle is described above, the present invention, however, is not limited to the navigation system 100, but may be so arranged that the map information is acquired from a personal computer.

The map information is distributed from the storage section 440 for the structure acquiring the map information, the map information, however, may be acquired by searching the map information from a recording medium with the use of a drive and a driver at a personal computer. Namely, the map information may be appropriately read from the recording medium removably mounted on the terminal unit 300. With this arrangement, easy utilization of the map information and promotion of the usage can be realized. The server unit 400 may only distribute the map information so that each terminal unit 300 searches for a route. With this arrangement, the processing carried out by the coordinates matching section can be performed at each terminal unit 300.

The retrieval of the retrieval information described in the embodiment may be omitted.

The current position recognizer recognizes the current position information based on the data output from the various sensors and the GPS data output from the GPS receiver in the above described embodiment other arrangement, however, may alternatively be used to recognize the current position of the movable body. As described above, the current position recognizer may recognize the pseudo-coordinates position input at the terminal input section 330 as the current position.

Though the structure for sending the plurality of travel routes which are selected based on the current position information, the destination information and the configuration information is described, it is not restricted to the structure. The travel routes may be specified, i.e. the routes are searched simply based on the current position information and the destination information; all acquired travel routes may be sent to the terminal unit 300; and the terminal unit 300 may select the travel route by the configuration at the terminal input section 330. Note that since the plurality of or one selected travel route is sent to the terminal unit 300, the communication load for sending/receiving the travel route and a complicated operation of selecting one travel route from the plurality of travel routes may be reduced, thereby emphasizing its convenience.

The route processor 452 and the coordinates matching section are provided as programs of the CPU 450, however, may alternatively be provided as hardware such as a circuit board or an element such as a single IC (Integrated Circuit). With the readings from a program or a recording medium, advantages such as the easy handling and promotion of the utilization can be attained.

The terminal unit 300 is provided with a transceiver 310 in the above description. However, the transceiver 310 may be separated from the terminal unit 300 and a mobile phone or a PHS that is connected to the terminal unit 300 may be used as the transceiver 310. In this case, the transceiver 310 is connected to the terminal unit 300 to appropriately send/receive information.

The arrangement and the operating procedures for implementing the above embodiment may be appropriately modified as long as the scope of the present invention can be attained.

What is claimed is:

1. A map information processing device for displaying a current position of a movable body overlaid onto a map on a display, comprising:
   a current position acquiring section that acquires a current position of the movable body;
   a destination acquiring section that acquires a destination to which the movable body travels;
   a matching data acquiring section that acquires a matching data including a plurality of point information that has a coordinates information and a unique point information and represents a predetermined point, and a segment information that has a unique segment information and connects a pair of the point information, the matching data representing a road with the point information and the segment information, the matching data further including a flag information that shows with one-bit a relation of one of the plurality of point information with other one of the plurality of point information having the same coordinates according to the determination whether the one of the plurality of point information and the other one of the plurality of point information are identical or not to represent the road arrangement, the matching data including a matching mesh information divided in a predetermined areas;
   a display data acquiring section that acquires a display data for displaying the map information, the display data including a component data representing a component of the map of a predetermined area, and including a plurality of display mesh information divided in a predetermined areas;
   a search section that searches for a travel route on which the movable body travels based on the current position and the destination using the matching data;
   a correction section that recognizes the relation of the one of the plurality of point information with the other one of plurality of point information based on the flag information of the point information to recognize the road arrangement and corrects the current position so that the current position is on the road represented by the point information and the segment information of the matching data; and
   a display controller that displays the travel route based on the point information and the segment information of the matching data on the display and overlays the current position corrected by the correction section onto the travel route displayed on the display,
   the display controller displaying, on the display: the matching mesh information including the point information and the segment information representing the road corresponding to the travel route; and the display mesh information corresponding to areas not covered by the areas represented by the matching mesh information.

2. The map information processing device according to claim 1, further comprising:
   a display data acquiring section that acquires a display data including an element data for an element constituting a map of a predetermined area corresponding to the matching data,
   wherein the display controller displays an element of the map excluding the road displayed based on a road information based on the display data.

3. The map information processing device according to claim 2,
   wherein the matching data has a plurality of matching mesh information divided into predetermined areas,
   wherein the display data has a plurality of display mesh information divided into predetermined areas, and
   wherein the display controller displays the current position overlaid onto the map based on the matching mesh information including the point information and the segment information, each of which generates the road information representing the road on which the corrected current position is overlaid on the display, and displays the map for areas other than the areas represented by the matching mesh information based on the display mesh information.

4. The map information processing device according to any one of claims 1,
   wherein the matching data has a line block information including an information for the road arrangement associated with the plurality of the segment information that represent one road, and
   wherein the display controller uses the information for the road arrangement in the line block information to display the road and displays the map on the display.

5. The map information processing device according to any one of claims 1,
   wherein the display controller generates a polyline connecting the point information, and displays the road based on the polyline on the display.

6. The map information processing device according to anyone of claims 1 for distributing the map information over a network,
   wherein the map information has the matching data including the plurality of point information that has the coordinates information and the unique point information and represents the predetermined points, and the segment information that has the unique segment information and connects the pair of point information, and representing the road with the point information and the segment information, and the display data including the element data for the element constituting the map of the predetermined area corresponding to the matching data,
   the map information processing device, further comprising:
   a request information recognizer that recognizes a request information for requesting the distribution of at least one of the matching data and the display data; and
   a delivery controller that distributes at least one of the matching data and the display data over the network based on the request information recognized by the request information recognizer.

7. The map information processing device according to claim 6,
   wherein the element data of the display data has a road element data for displaying the road and a secondary element data for displaying an element constituting a map excluding the road, and
   wherein the delivery controller distributes only the secondary element data as the display data for the area corresponding to the matching data when the request information recognizer recognizes that the request information includes the matching data and the display data for the area corresponding to the requested matching data.

8. The map information processing device according to claim 6, wherein the request information requests the distribution of the map information to be used to provide the traveling state of a movable body.

9. The map information processing device according to any one of claims 1 for distributing the map information over the network and providing the traveling state of a movable body with use of the map information, wherein the map information has the matching data including the plurality of point information that has the coordinates information and the unique point information and represents the predetermined points, the segment information that has the unique segment information and connects the pair of point information, representing the road with the point information and the segment information and including the plurality of matching mesh information divided into predetermined areas, and the display data including the element data for the element constituting the map of the predetermined area corresponding to the matching data, the map information processing device, further comprising:

a storage for storing the map information;

an information acquiring section that acquires the current position information for the current position of the movable body and a destination information for a destination to which the movable body travels;

a search section that searches a travel route on which the movable body travels with use of the matching data based on the current position information and the destination information; and a delivery controller that distributes the matching mesh information including the point information and the segment information that represent the road corresponding to the searched travel route and the display mesh information corresponding to the area other than the area represented by the matching mesh information together with information for the travel route over the network.

10. The map information processing device according to claim 9, wherein the element data of the display data has a road element data for displaying the road and a secondary element data for displaying an element consisting of a map excluding the road, and wherein the delivery controller also distributes the secondary element data of the display data for the area corresponding to the matching mesh information to be distributed.

11. The map information processing device according to any one of claims 1, further comprising:

a map information acquiring section that acquires at least the point information out of the map information from a recording medium that stores the map information including the plurality of point information that has the coordinates information and the unique point information and represents the predetermined points, and the segment information that has the unique segment information and connects the pair of point information, and representing the road with the point information and the segment information, the point information further having a flag information that shows a relation of the point information with other point information according to the determination whether the represented points are identical or not and represents the road arrangement; and a coordinates matching section that recognizes the relation of the point information with other point information based on the flag information of the point information acquired by the map information acquiring section and recognizes the road arrangement.

12. The map information processing device according to claim 11, comprising a storage having a recording medium that stores the map information and a reading section that reads the map information stored in the recording medium, the map information including the plurality of point information that has the coordinates information and the unique point information and represents predetermined points, and the segment information that has the unique segment information and connects the pair of point information, and representing the road with the point information and the segment information, the point information further having the flag information that shows the relation of the point information with other point information according to the determination whether the represented points are identical or not and represents the road arrangement.

13. The map information processing device according to any one of claims 1, wherein the map information processing device performs a processing on the map information being stored in a storage, including the plurality of point information that has the coordinates information and the unique point information and represents the predetermined points, and the segment information that has the unique segment information and connects the pair of point information, and representing the road with the point information and the segment information, and wherein the point information has a flag information showing a relation with other point information according to the determination whether the represented points are identical or not and representing the road arrangement;

the map information processing device, further comprising:

a map information acquiring section that acquires at least the point information out of the map information; and a coordinates matching section that recognizes the relation of the point information with other point information based on the flag information of the point information acquired by the map information acquiring section and recognizes the road arrangement.

14. The map information processing device according to claim 13, comprising a storage that stores the map information, the map information including the plurality of point information that has the coordinates information and the unique point information and represents the predetermined points, and the segment information that has the unique segment information and connects the pair of point information, and representing the road with the point information and the segment information, the point information further having the flag information that shows the relation of the point information with other point information according to the determination whether the represented points are identical or not and represents the road arrangement.

15. The map information processing device according to any one of claims 11, wherein the coordinates matching section recognizes the relation of the point information as the coordinates information of the point information acquired by the map information acquiring section are identical based on the flag information.

16. The map information processing device according to any one of claims 13, wherein the coordinates matching section recognizes the relation of the point information as the coordinates information of the point information acquired by the map information acquiring section are identical based on the flag information.

17. The map information processing device according to any one of claims 11, wherein the coordinates matching section recognizes that the road arrangement is still continuing, the road being represented by the different point information connected with the different link, by recognizing that the different point information represents the identical point.

18. The map information processing device according to any one of claims 13, wherein the coordinates matching section recognizes that the road arrangement is still continuing, the road being represented by the different point information connected with the different link, by recognizing that the different point information represents the identical point.

19. The map information processing device according to any one of claims 11, further comprising a search section that searches the travel route based on the road arrangement recognized by the coordinates matching section.

20. The map information processing device according to any one of claims 13, further comprising a search section that searches the travel route based on the road arrangement recognized by the coordinates matching section.

21. A map information processing system, comprising:
a terminal unit including a display for displaying a current position of a movable body overlaid onto a map; and
a map information processing device being connected to the terminal unit over a network in a manner capable of sending/receiving various information
the map information processing device, comprising:
a current position acquiring section that acquires a current position of the movable body;
a destination acquiring section that acquires a destination to which the movable body travels;
a matching data acquiring section that acquires a matching data including a plurality of point information that has a coordinates information and a unique point information and represents a predetermined point, and a segment information that has a unique segment information and connects the pair of the point information, the matching data representing a road with the point information and the segment information, the matching data further including a flag information that shows with one-bit a relation of one of the plurality of point information with other one of the plurality of point information having the same coordinates according to the determination whether the one of the plurality of point information and the other one of the plurality of point information are identical or not to represent the road arrangement, the matching data including a matching mesh information divided in a predetermined areas;
a display data acquiring section that acquires a display data for displaying the map information, the display data including a component data representing a component of the map of a predetermined area, and including a plurality of display mesh information divided in a predetermined areas;
a search section that searches for a travel route on which the movable body travels based on the current position and the destination using the matching data;
a correction section that recognizes the relation of the one of the plurality of point information with the other one of plurality of point information based on the flag information of the point information to recognize the road arrangement and corrects the current position so that the current position is on the road represented by the point information and the segment information of the matching data; and
a display controller that displays the travel route based on the point information and the segment information of the matching data on the display and overlays the current position corrected by the correction section onto the travel route displayed on the display, the display controller displaying, on the display: the matching mesh information including the point information and the segment information representing the road corresponding to the travel route; and the display mesh information corresponding to areas not covered by the areas represented by the matching mesh information.

22. A map information processing system, comprising:
a map information processing device, comprising:
a map information acquiring section that acquires at least a point information out of a map information from a recording medium that stores a matching data and a display data for displaying a map information, the matching data including a plurality of point information that has a coordinates information and a unique point information and represents a predetermined point, and a segment information that has a unique segment information and connects a pair of the point information, the matching data representing a road with the point information and the segment information, the point information further having a flag information that shows with one-bit a relation of one of the plurality of point information with other one of plurality of point information according to the determination whether the represented points are identical or not to represent the road arrangement, the matching data including a matching mesh information divided in a predetermined areas, the display data including a component data representing a component of the map of a predetermined area and including a plurality of display mesh information divided in a predetermined areas;
a coordinates matching section that recognizes the relation of the point information with the other point information based on the flag information of the point information acquired by the map information acquiring section and recognizes the road arrangement,
a current position acquiring section that acquires a current position of the movable body information for the current position;
a destination acquiring section that acquires a destination to which the movable body travels; and
a search section that searches for a travel route on which the movable body travels based on the current position and the destination using the matching data;
the system, further comprising:
a terminal unit that acquires the road arrangement and the travel route recognized by the map information processing device over a network,
the map information processing device distributing, to the terminal unit: the matching mesh information including the point information and the segment information representing the road corresponding to the travel route; and the display mesh information corresponding to areas not covered by the areas represented by the matching mesh information,
the terminal unit displaying the distributed map information overlaying on the travel route.

23. A map information processing method for displaying a current position of a movable body overlaid onto a map on a display, comprising the steps of:
acquiring a current position for the current position of the movable body and a destination to which the movable body travels;
correcting the current position so that the current position based on the acquired current position is on a road represented by a point information and a segment information of a matching data including the plurality of point information that has a coordinates information and a unique point information and represents predetermined points and a segment information that has a unique segment information and connects the pair of point information, the matching data further including a flag information that shows with one-bit a relation of the point information with other point information according to the determination whether the represented points are identical or not and represents the road arrangement, the current position being corrected by recognizing the relation of the point information with the other point information having the same coordinates information based on the flag information of the point information to recognize the road arrangement;

searching a travel route on which the movable body travels based on the current position and the destination using the matching data;

displaying the travel route based on the point information and the segment information on the display to display the map on the display, and overlaying the current position corrected by the correction section onto the travel route displayed on the display, the matching data including a matching mesh information divided in a predetermined areas;

acquiring a display data for displaying the map information, the display data including a component data representing a component of the map of a predetermined area, and including a plurality of display mesh information divided in a predetermined areas; and displaying on the display: the matching mesh information including the point information and the segment information representing the road corresponding to the travel route; and the display mesh information corresponding to areas not covered by the areas represented by the matching mesh information.

24. A map information processing method executed by a computing section for displaying a current position overlaid onto a map on a display of a terminal unit connected to a server unit that stores a map information over a network in a manner capable of sending/receiving various information, the map information processing method executed by the computing section, comprising the steps of:

generating a current position for a current position of a movable body and a destination to which the movable body travels at the terminal unit;

acquiring the current position at the server unit from the terminal unit over the network;

correcting the current position at the server unit so that the current position is on a road represented by a point information and a segment information of a matching data of the map information including the plurality of point information that has a coordinates information and a unique point information and represents predetermined points and a segment information that has a unique segment information and connects the pair of point information, the matching data further including a flag information that shows with one-bit a relation of the point information with other point information according to the determination whether the represented points are identical or not and represents the road arrangement, the current position being corrected by recognizing the relation of the point information with the other point information having the same coordinates information based on the flag information of the point information to recognize the road arrangement;

acquiring the corrected current position and the matching data at the terminal unit from the server unit over the network;

searching a travel route on which the movable body travels based on the current position and the destination using the matching data;

displaying the represented travel route based on the point information and the segment information of the acquired matching data on the display of the terminal unit, and overlaying the acquired and corrected current position onto the travel route displayed on the display, the matching data including a matching mesh information divided in a predetermined areas;

acquiring a display data for displaying the map information, the display data including a component data representing a component of the map of a predetermined area, and including a plurality of display mesh information divided in a predetermined areas; and displaying on the display: the matching mesh information including the point information and the segment information representing the road corresponding to the travel route; and the display mesh information corresponding to areas not covered by the areas represented by the matching mesh information.

25. A map information processing method executed by a computing section for and displaying a current position overlaid onto a map on a display of a terminal unit connected to a server unit that stores a map information over a network in a manner capable of sending/receiving various information, the map information processing method executed by the computing section, comprising the steps of:

generating a current position for a current position of a movable body and a destination to which the movable body travels at the terminal unit;

acquiring a matching data of the map information including a plurality of point information that has a coordinates information and a unique point information and represents predetermined points, and a segment information that has a unique segment information and connects the pair of point information, and representing a road with the point information and the segment information, at the terminal unit from the server unit over the network, the matching data further including a flag information that shows with one-bit a relation of the point information with other point information according to the determination whether the represented points are identical or not and represents the road arrangement;

correcting the current position so that the current position is on the road represented by the point information and the segment information of the acquired matching data at the terminal unit, the current position being corrected by recognizing the relation of the point information with the other point information having the same coordinates information based on the flag information of the point information to recognize the road arrangement;

searching a travel route on which the movable body travels based on the current position and the destination using the matching data;

displaying the travel route based on the point information and the segment information of the matching data on the display and overlaying the corrected current position onto the travel route displayed on the display, the matching data including a matching mesh information divided in a predetermined areas;

acquiring a display data for displaying the map information, the display data including a component data representing a component of the map of a predetermined area, and including a plurality of display mesh information divided in a predetermined areas; and displaying on the display: the matching mesh information including the point information and the segment information representing the road corresponding to the travel route; and the display mesh information corresponding to areas not covered by the areas represented by the matching mesh information.

26. The map information processing method according to claim 23 for distributing the map information by a computing section over a network,
   wherein the map information has the matching data including the plurality of point information that has the coordinates information and the unique point information and represents the predetermined points, and the segment information that has the unique segment information and connects the pair of point information, and representing the road with the point information and the segment information, and a display data including an element data for an element constituting the map of a predetermined area corresponding to the matching data,
   the map information processing method executed by the computing section, comprising the steps of:
   recognizing a request information for requesting the distribution of at least one of the matching data and the display data; and
   distributing at least one of the matching data and the display data over the network based on the recognized request information.

27. The map information processing method according to claim 23 for distributing the map information by a computing section over a network to provide the traveling state of a movable body with use of the map information,
   wherein the map information has the matching data including the plurality of point information that has the coordinates information and the unique point information and represents the predetermined points, the segment information that has the unique segment information and connects the pair of point information, representing the road with the point information and the segment information, and including a plurality of matching mesh information divided into predetermined areas, and a display data including an element data for an element constituting the map of a predetermined area corresponding to the matching data,
   the map information processing method executed by the computing section, comprising the steps of:
   acquiring a current position information for a current position of the movable body and a destination information for a destination to which the movable body travels;
   searching a travel route on which the movable body travels with use of the matching data based on the current position information and the destination information; and
   distributing a matching mesh information including the point information and the segment information that represent the road corresponding to the searched travel route and a display mesh information corresponding to an area other than the area represented by the matching mesh information together with information for the travel route over the network.

28. The map information processing method according to claim 23 for processing the map information including the plurality of point information that has the coordinates information and the unique point information and represents the predetermined points, and the segment information that has the unique segment information and connects the pair of point information, and representing the road with the point information and the segment information,
   wherein the point information has a flag information showing a relation with other point information according to the determination whether the represented points are identical or not and representing the road arrangement,
   the map information processing method, comprising the step of recognizing the road arrangement by recognizing the relation of the point information with other point information based on the flag information.

29. The map information processing method according to claim 28, comprising the step of recognizing the road arrangement by recognizing the relation of the point information with other point information based on the flag information of the map information stored in a recording medium storing the map information.

30. A computer readable medium storing a map information processing program in a manner readable by a computing section, the program executing a map information processing method by a computing section,
   the method, comprising the steps of:
   acquiring a current position information for the current position;
   correcting the current position information so that the current position based on the acquired current position information is on a road represented by a point information and a segment information of a matching data including the plurality of point information that has a coordinates information and a unique point information and represents predetermined points and a segment information that has a unique segment information and connects the pair of point information;
   displaying the road based on the point information and the segment information on a display to display the map on the display, and overlaying the current position corrected by the correction section onto the road displayed on the display, the matching data including a matching mesh information divided in a predetermined areas;
   acquiring a display data for displaying the map information, the display data including a component data representing a component of the map of a predetermined area, and including a plurality of display mesh information divided in a predetermined areas; and
   displaying on the display: the matching mesh information including the point information and the segment information representing the road corresponding to the travel route; and the display mesh information corresponding to areas not covered by the areas represented by the matching mesh information.

31. A computer readable medium storing a map information processing program in a manner readable by a computing section, the program executing a map information processing method for displaying a current position overlaid onto a map on a display of a terminal unit connected to a server unit that stores a map information over a network in a manner capable of sending/receiving various information, the program being executed by a computing section,
   the map information processing method executed by the computing section, comprising the steps of:
   generating a current position information for a current position at the terminal unit;
   acquiring the current position information at the server unit from the terminal unit over the network;
   correcting the current position information at the server unit so that the current position is on a road represented by a point information and a segment information of a matching data of the map information including the plurality of point information that has a coordinates information and a unique point information and represents predetermined points and a segment information that has a unique segment information and connects the pair of point information;

acquiring the corrected current position information and the matching data at the terminal unit from the server unit over the network;

displaying the represented road based on the point information and the segment information of the acquired matching data on the display of the terminal unit, and overlaying the acquired and corrected current position information onto the road displayed on the display, the matching data including a matching mesh information divided in a predetermined areas;

acquiring a display data for displaying the map information, the display data including a component data representing a component of the map of a predetermined area, and including a plurality of display mesh information divided in a predetermined areas; and displaying on the display: the matching mesh information including the point information and the segment information representing the road corresponding to the travel route; and the display mesh information corresponding to areas not covered by the areas represented by the matching mesh information.

32. A computer readable medium storing a map information processing program in a manner readable by a computing section, the program executing a map information processing method for and displaying a current position overlaid onto a map on a display of a terminal unit connected to a server unit that stores a map information over a network in a manner capable of sending/receiving various information, the program being executed by a computing section, the map information processing method executed by the computing section, comprising the steps of:

generating a current position information for a current position at the terminal unit;

acquiring a matching data of the map information including a plurality of point information that has a coordinates information and a unique point information and represents predetermined points, and a segment information that has a unique segment information and connects the pair of point information, and representing a road with the point information and the segment information, at the terminal unit from the server unit over the network;

correcting the current position information so that the current position is on the road represented by the point information and the segment information of the acquired matching data at the terminal unit;

displaying the road based on the point information and the segment information of the matching data on the display and overlaying the corrected current position information onto the road displayed on the display, the matching data including a matching mesh information divided in a predetermined areas;

acquiring a display data for displaying the map information, the display data including a component data representing a component of the map of a predetermined area, and including a plurality of display mesh information divided in a predetermined areas; and displaying on the display: the matching mesh information including the point information and the segment information representing the road corresponding to the travel route; and the display mesh information corresponding to areas not covered by the areas represented by the matching mesh information.

* * * * *